United States Patent
Wu et al.

(10) Patent No.: US 9,992,174 B2
(45) Date of Patent: Jun. 5, 2018

(54) DETECTING DISCLOSED CONTENT SOURCES USING DYNAMIC STEGANOGRAPHY

(71) Applicant: Box, Inc., Los Altos, CA (US)

(72) Inventors: Albert Fung Wu, Castro Valley, CA (US); Nazar Andrienko, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 0 days. days.

(21) Appl. No.: 14/938,679

(22) Filed: Nov. 11, 2015

(65) Prior Publication Data
US 2017/0134344 A1    May 11, 2017

(51) Int. Cl.
| | |
|---|---|
| *H04L 29/00* | (2006.01) |
| *H04L 29/06* | (2006.01) |
| *G06K 19/06* | (2006.01) |
| *H04L 29/08* | (2006.01) |

(52) U.S. Cl.
CPC .... *H04L 63/0428* (2013.01); *G06K 19/06037* (2013.01); *H04L 67/22* (2013.01); *H04L 63/102* (2013.01)

(58) Field of Classification Search
CPC . H04L 63/10; H04L 2209/56; H04L 2209/60; H04L 63/1441; H04L 12/5895; H04L 63/123; H04L 9/00
See application file for complete search history.

(56) References Cited

U.S. PATENT DOCUMENTS

| | | | |
|---|---|---|---|
| 2006/0206715 A1* | 9/2006 | Cowan | H04L 63/0428 713/176 |
| 2009/0049298 A1* | 2/2009 | Hatter | H04L 9/32 713/176 |
| 2010/0325413 A1* | 12/2010 | Chandramouli | H04N 21/235 713/150 |

(Continued)

OTHER PUBLICATIONS

Spagnolo et al., "Content fragile watermarking based on a computer generated hologram coding technique." Journal of Optics A: pure and applied optics 7.7 (2005): 333.

(Continued)

*Primary Examiner* — Ghazal Shehni
(74) *Attorney, Agent, or Firm* — Vista IP Law Group, LLP

(57) ABSTRACT

Systems for forensic steganography. A server is interfaced with storage facilities that store an object accessible by two or more users, each of which users are associated with respective profiles comprising one or more user-specific attributes. A method detects a user request to view the object. User-specific attributes are encoded into a steganographic message, which is formatted for saving into one or more locations in the object, thus generating a protected object. The protected object is delivered to the requesting user. Encoding, application and formatting techniques are configured to make the steganographic message undetectable by human viewing of the protected object. A web crawler or other policing technique can detect misappropriation in the form of unauthorized dissemination by detecting the presence of the encoded steganographic message embedded in the protected object. Decoding the steganographic message reveals the user-specific attributes so as to identify the user who disseminated the protected object.

20 Claims, 17 Drawing Sheets

(56) References Cited

U.S. PATENT DOCUMENTS

2015/0319403 A1* 11/2015 Antipa .............. H04M 1/72561
    386/224

OTHER PUBLICATIONS

"Invisible Watermarking", URL:https://web.archive.org/web/20100625024235/http://www.adptools.com:80/en/signmyimage-durability.html, 2010.
"How to Create Secret Watermarks for Your Photos", URL:https://phlearn.com/tutorial/top-secret-waterwarks/, 2015.
Andrei Oprinca, "Create an invisible Photoshop watermark", URL:https://www.psdbox.com/tutorials/create-an-invisible-water-mark-in-photoshop, 2008.
Jonathan Bailey, "SignMyImage: Cheap Invisible Watermarking", https://www.plagiarismtoday.com/2010/08/02/signmyimage-cheap-invisible-watermarking/, Aug. 2010.
Michael Schirber, "New Invisible Watermark to Prevent Fake Photos", https://www.livescience.com/3869-invisible-watermark-prevent-fake-pholos.html, Jun. 2005.

* cited by examiner

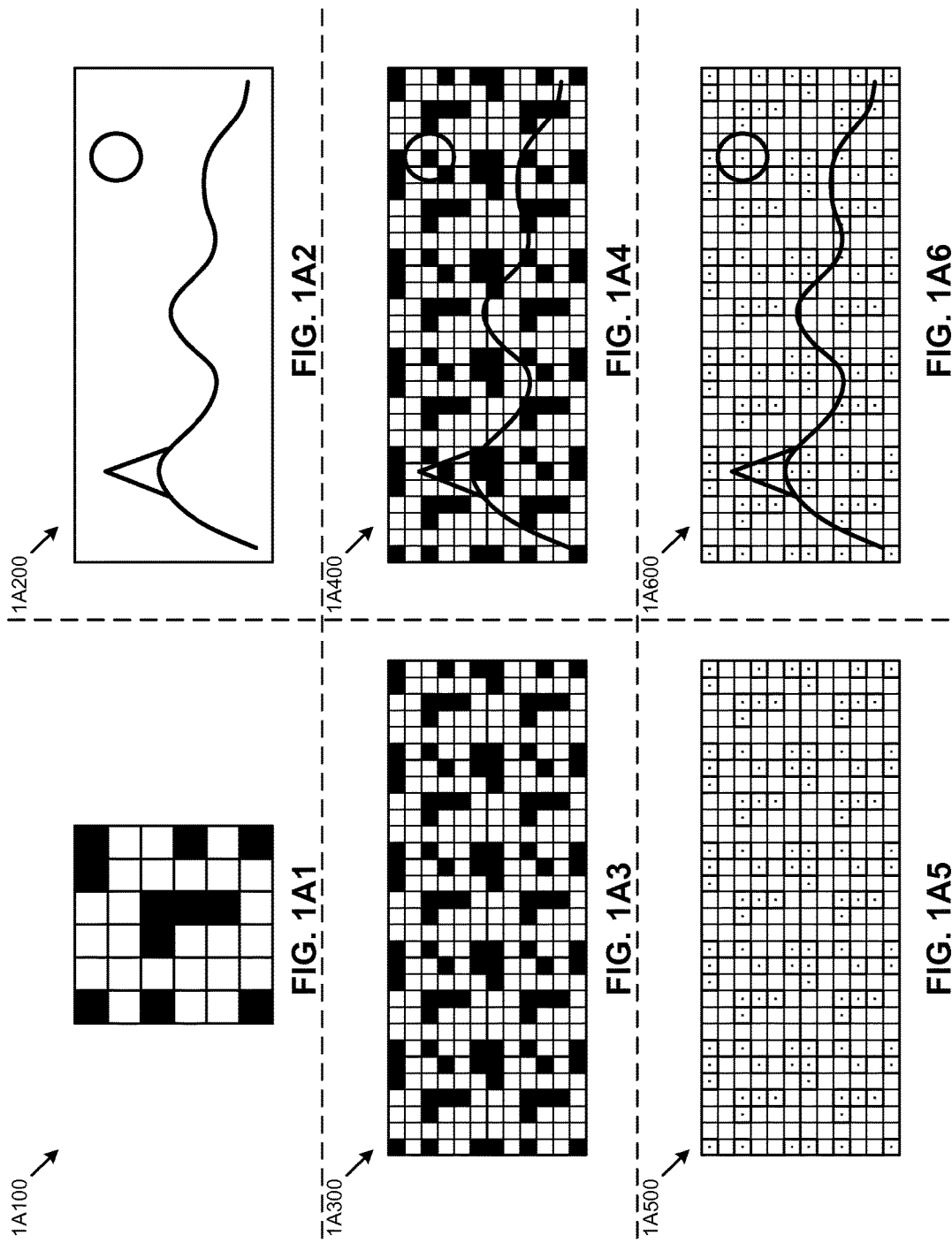

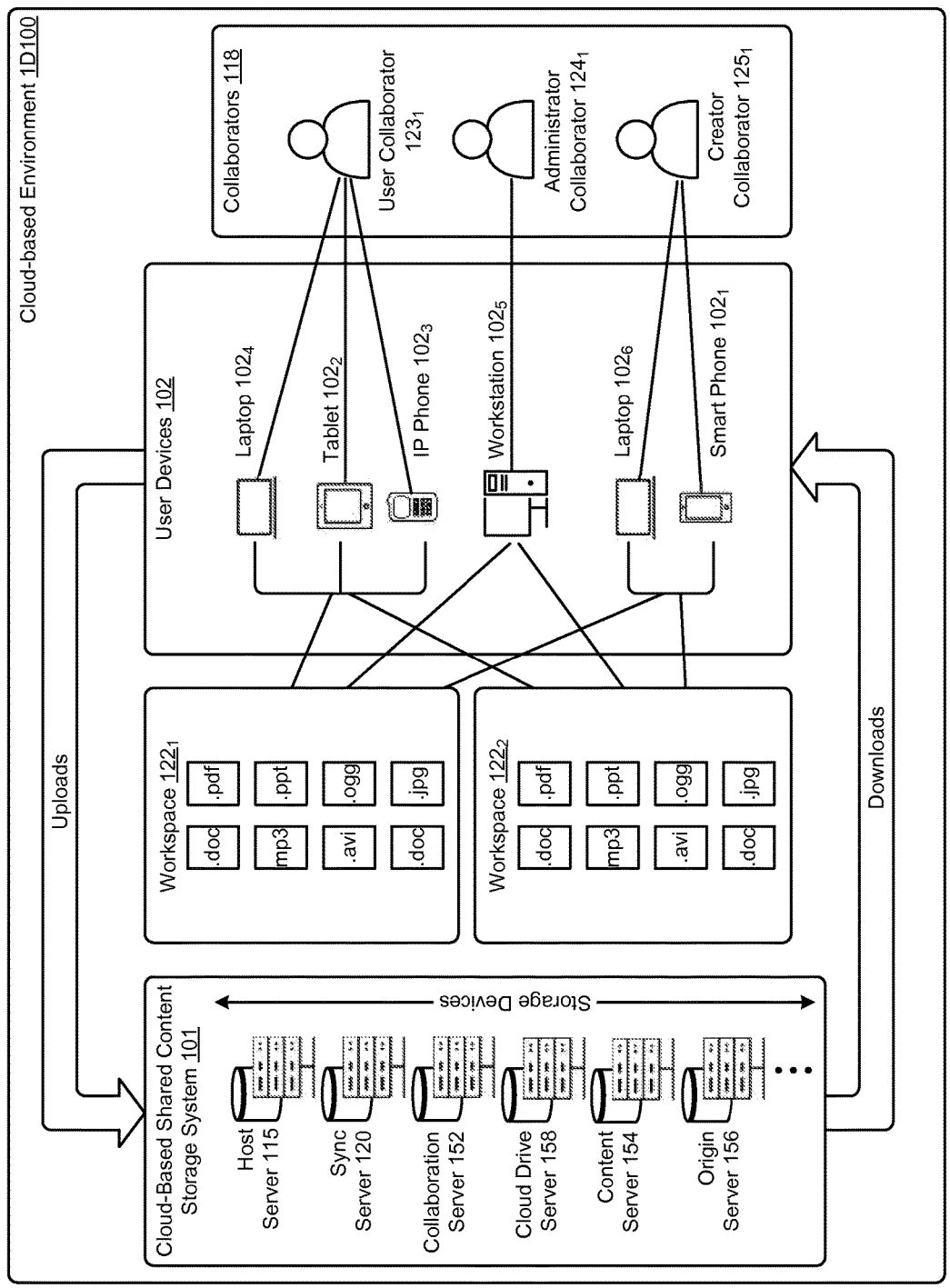
FIG. 1D1

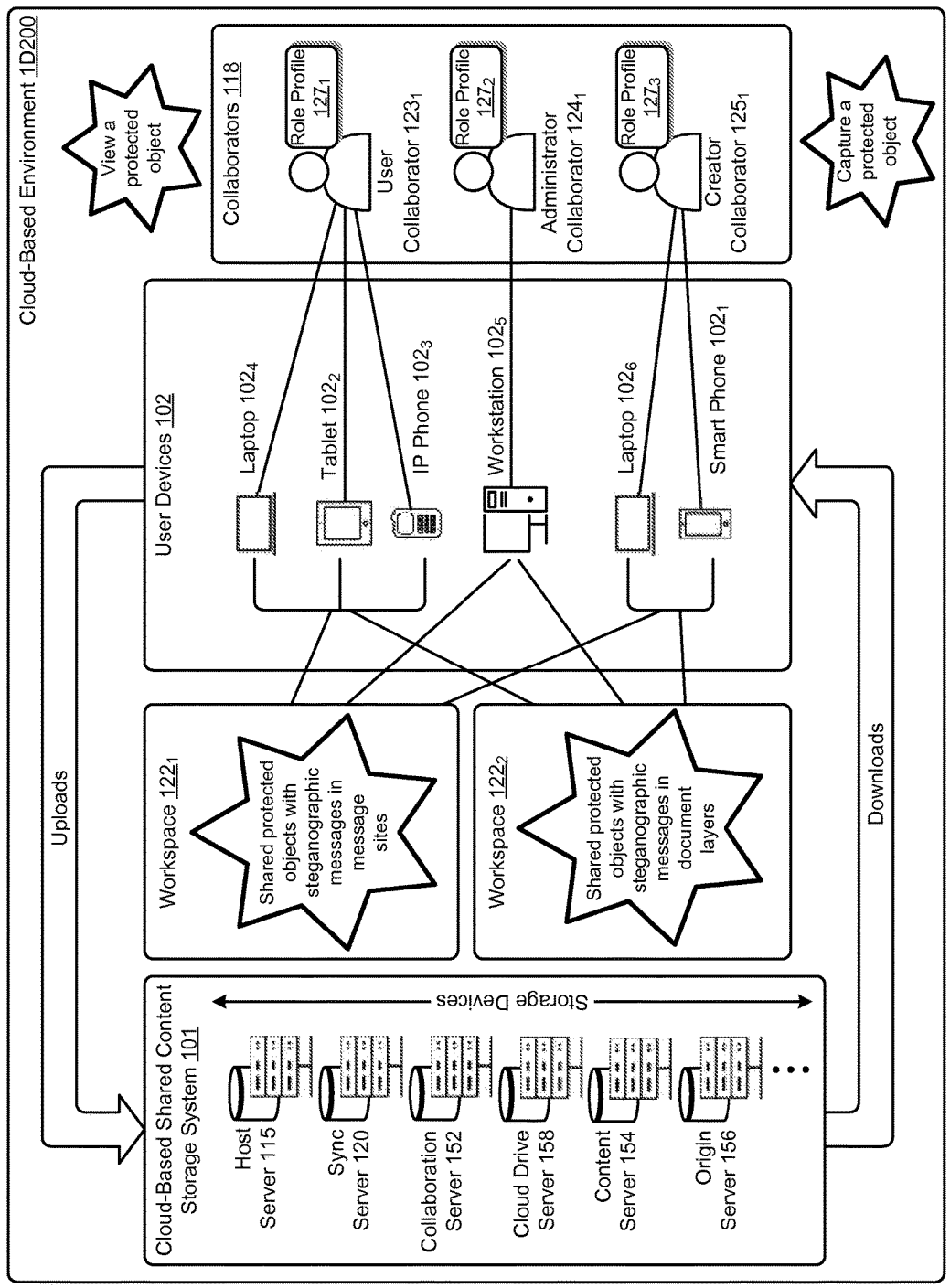
FIG. 1D2

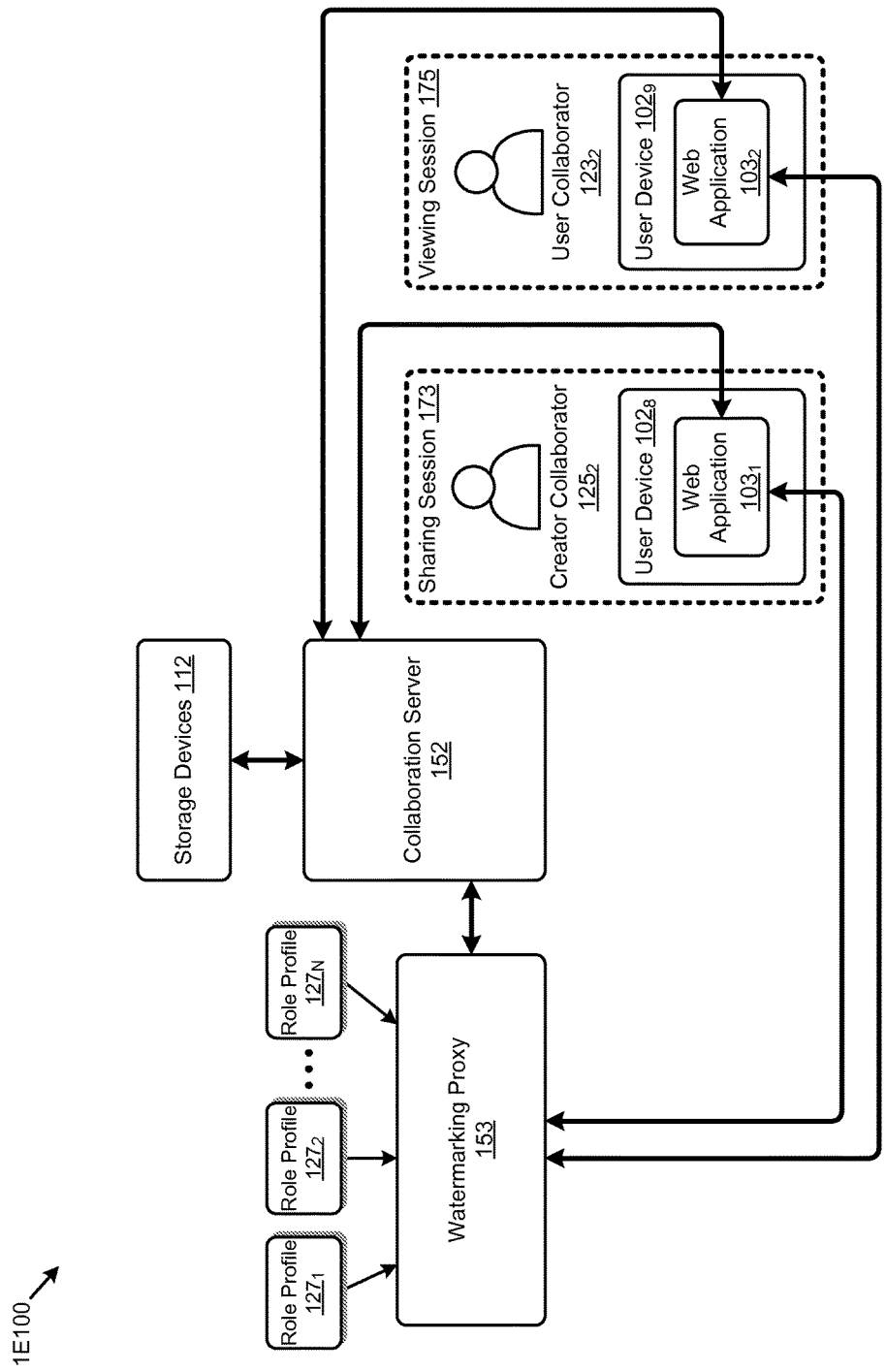
FIG. 1E1

| User ID | Device ID | User Hash | File ID | Steganography Method | Steganography Hash |
|---|---|---|---|---|---|
| UIDA | DID1 | npc07... | FIDa1 | 2DBarcode | a8a89... |
| UIDB | DID2 | c4owe... | FIDb2 | Barcode+DSSS | 08uqu... |
| ... | ... | ... | ... | ... | ... |
| UIDZ | DIDN | p3ct4... | FIDzN | Other | t7obe... |

DETECTING DISCLOSED CONTENT SOURCES USING DYNAMIC STEGANOGRAPHY

FIELD

This disclosure relates to the field of forensic steganography, and more particularly to techniques for detecting disclosed content sources using dynamic steganography.

BACKGROUND

The proliferation of cloud-based services and platforms continues to increase. Specifically, cloud-based shared content storage systems have impacted the way people and corporations store their electronically stored information objects (e.g., files, images, videos, etc.). The availability of cloud-based shared content storage systems has also impacted the way such personal and corporate content is shared. One benefit of using such cloud-based systems is the ability to share secure content (e.g., strategic documents, product specifications, financial statements, etc.) without necessitating delivery of unique copies of the content to each of the unique users (e.g., employees) in the audience. In some cases, however, such secure content can be disclosed (e.g., leaked, whether by accident or with malicious intent) by means of an unmonitored sharing (e.g., screen capture) of the object being viewed. For example, a confidential presentation might be shared for online, read-only viewing, and a viewer in the audience might capture one or more slides presented (e.g., using <print screen>, a screen capture tool, a photo, etc.) for disclosure to various third parties (e.g., unauthorized parties). In some cases, the captured content might be later discovered, and often in such cases, the content owners might want to determine the source (e.g., perpetrating employee) of the leak.

Various legacy techniques have been implemented to provide security to documents. Some legacy techniques insert or overlay a watermark on a document to visually indicate a level of security (e.g., "confidential"), and/or to indicate a level of authenticity (e.g., "official copy"). Such techniques, however, do not provide a means to track the source of inappropriate (e.g., illegal, unauthorized) dissemination of the content. Further, such techniques are perceivable by the human eye, and can be readily defeated. For example, a "Confidential" watermark can sometimes be removed using an imaging editing tool. What is needed is a way to embed identifying information (e.g., an employee's name or ID) into content objects (e.g., images, video, text, etc.) such that the embedded identifying information appears in the image (e.g., as hard-to-remove "noise" in the image)—yet is not perceivable by the viewer. The embedded identifying steganographic information needs to be recoverable by computerized techniques, even though the human-perceived visual quality of the image is not negatively impacted. Further, the embedded and hard-to-remove "noise" in the computer-readable image needs to remain intact in all of the misappropriated (e.g., leaked) portions of the protected objects that may proliferate through electronic networks such as the Internet.

The problem to be solved is therefore rooted in technological limitations of the legacy approaches. Improved techniques, in particular improved application of technology, are needed to address the problem of discovering the source of leaked content that has been disclosed in the form of a screen capture of the content. The technologies applied in the aforementioned legacy approaches fail to achieve sought-after capabilities of the herein disclosed techniques for detecting disclosed content sources using dynamic steganography. What is needed is a technique or techniques to improve the application and efficacy of various technologies as compared with the application and efficacy of legacy approaches.

SUMMARY

The present disclosure provides systems, methods, and computer program products suited to address the aforementioned issues with legacy approaches. More specifically, the present disclosure provides a detailed description of techniques used in systems, methods, and in computer program products for detecting disclosed content sources using dynamic steganography. Certain embodiments are directed to technological solutions for dynamically injecting steganographic information into content presented to a user, and extracting the steganographic information from a screen capture of the content to detect the source (e.g., the user ID or employee ID) of the disclosure, which embodiments advance the relevant technical fields, as well as advancing peripheral technical fields. The disclosed embodiments modify and improve over legacy approaches. In particular, the herein-disclosed techniques provide technical solutions that address the technical problems attendant to discovering the source of leaked content that has been disclosed in the form of a screen capture of the content, and such technical solutions serve to reduce use of computer memory, reduce demand for computer processing power, and reduce communication overhead needed. Specifically, use of the herein disclosed techniques support the sharing of large volumes of electronically stored information objects (e.g., files, images, videos, etc.), while reducing the storage capacity and computing resources otherwise required to share protected copies of such objects. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of steganographic marking as well as advances in the technical fields of distributed storage of leak-protected information.

Some of the disclosed embodiments commence upon identifying a server in a cloud-based environment to interface with one or more storage facilities that store objects accessible by two or more users. Upon a request to view an object, user attributes pertaining to the requestor are used to encode a steganographic message that is applied onto or into the object using one or more steganographic message sites that are determined based on respective content type. The resulting protected object is delivered to the requestor. The source of unauthorized disclosure can be determined based on only a portion of the protected object. A web crawler can search for unauthorized copies of the object.

In another aspect, a server or method detects a user request to view a particular object. User-specific attributes are encoded into a steganographic message, which is formatted for saving into one or more locations in the object, thus generating a protected object. The protected object is delivered to the requesting user. Encoding, application and formatting techniques are configured to make the steganographic message undetectable by human viewing of the protected object.

In another aspect, a web crawler or other policing technique can detect misappropriation in the form of unauthorized dissemination by detecting the presence of the encoded steganographic message embedded in the protected object. Decoding the steganographic message reveals user-specific attributes so as to identify the user who disseminated the protected object.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 1A1 through FIG. 1A6 present a series of views to illustrate a steganographic message application technique as used in systems for detecting disclosed content sources using dynamic steganography, according to some embodiments.

FIG. 1D1 presents a cloud-based environment having a cloud-based shared content management platform to implement detection of disclosed content sources using dynamic steganography, according to an embodiment.

FIG. 1D2 presents a schematic view of the cloud-based environment having workspaces that include dynamically-created content that is generated when implementing detection of disclosed content sources using dynamic steganography, according to an embodiment.

FIG. 1E1 is a schematic view of a data flow to implement techniques for detecting disclosed content sources using dynamic steganography, according to an embodiment.

FIG. 1E2 shows role profile data structures used to dynamically generate steganography messages in systems for detecting disclosed content sources using dynamic steganography, according to an embodiment.

FIG. 2 depicts a protocol used by cloud-based shared content storage system components for detecting disclosed content sources using dynamic steganography, according to an embodiment.

DETAILED DESCRIPTION

Figure 1B:
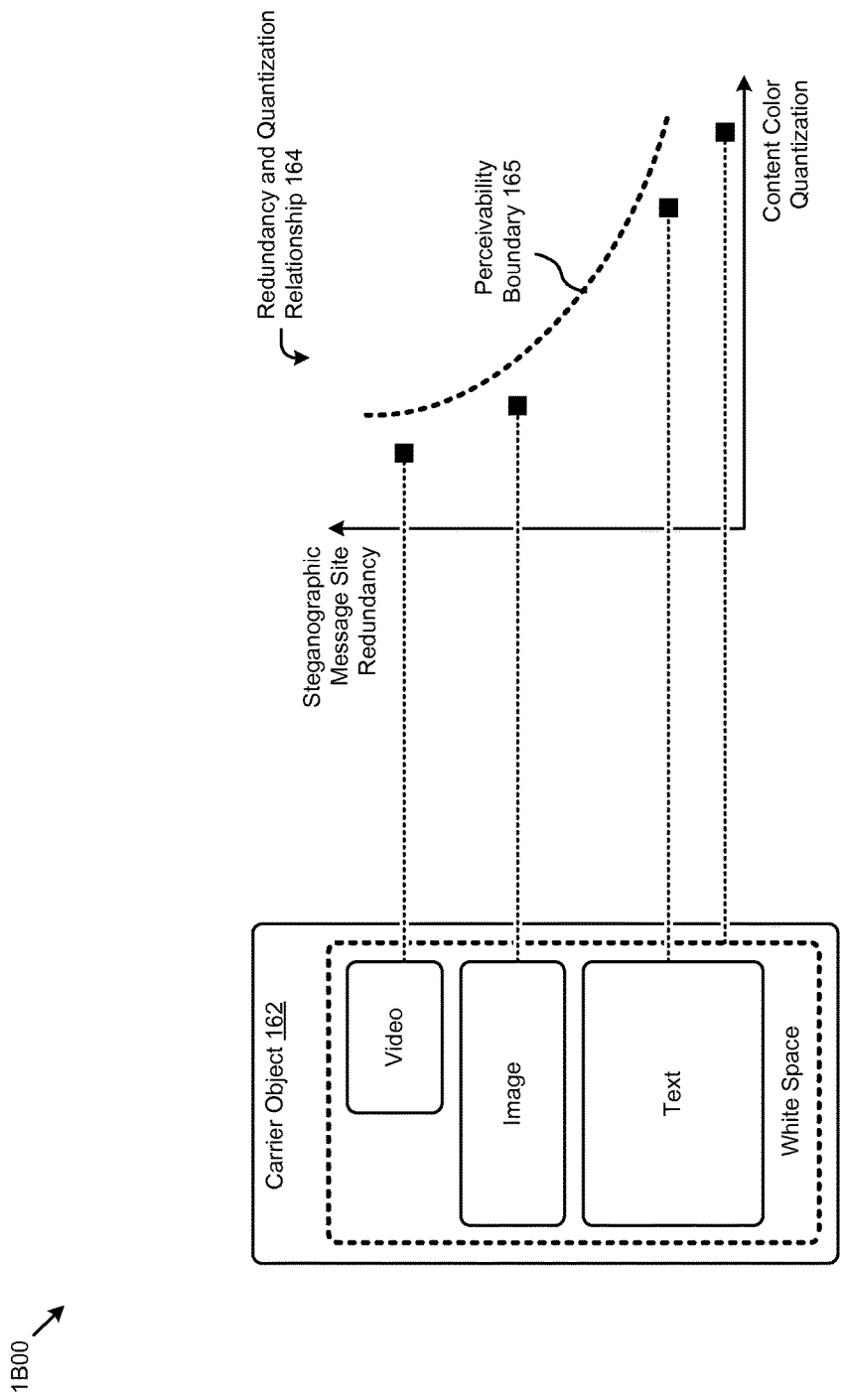
FIG. 1B presents a content-based steganographic message application technique as used in systems for detecting disclosed content sources using dynamic steganography, according to some embodiments.

Some embodiments of the present disclosure address the problem of discovering the source of leaked content that has been disclosed in the form of a screen capture of the content and some embodiments are directed to approaches for dynamically injecting steganographic information into content presented to a user, and extracting the information from a screen capture of the content to detect the source (e.g., the identity of the perpetrating discloser) of the content. More particularly, disclosed herein and in the accompanying figures are exemplary environments, systems, methods, and computer program products for detecting disclosed content sources using dynamic steganography.

Overview

Cloud-based shared content storage systems have impacted the way personal and corporate electronically stored information objects (e.g., files, images, videos, etc.) are stored, and has also impacted the way such personal and corporate content is shared and managed. One benefit of using such cloud-based systems is the ability to share secure content (e.g., strategic documents, product specifications, financial statements, etc.) without delivery of separate copies of the content to each of the users (e.g., employees) in the audience. In many cases downloads can be monitored and tracked, and stored and audited. In some cases, however, such secure content can be captured and disclosed (e.g., leaked) by means of a screen capture of the object being viewed. Some legacy techniques for providing security to documents insert or overlay a watermark on a document to visually indicate a level of security (e.g., "confidential"), and/or to indicate a level of authenticity (e.g., "official copy"). Such techniques, however, are readily detected by the viewer and do not provide means to track the source of inappropriate (e.g., unauthorized and/or illegal) dissemination of the content.

To address the need for discovering the source of leaked content that has been disclosed, for example, in the form of a screen capture, the techniques described herein discuss (1) configuring a server in a cloud-based environment to interface with one or more storage facilities that store objects shared with multiple users; (2) detecting a request to view a shared object from one of users; (3) encoding a steganographic message having attributes associated with the user in one or more steganographic message sites (e.g., 2D barcode); (4) applying one or more of the steganographic message sites (e.g., tiles) to the shared object to generate a protected object; and (5) initiating delivery of a rendered view of the protected object to the user. In one or more embodiments, the techniques described herein further include (6) identifying a recovered portion of the rendered view (e.g., a screen capture); (7) detecting a recovered steganographic message site from the recovered portion of the rendered view; and (8) decoding the recovered steganographic message site to identify the perpetrating user.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A1 through FIG. 1A6 present a sequence of views (e.g., view 1A100 through view 1A600) to illustrate a steganographic message application technique as used in systems for detecting disclosed content sources using dynamic steganography.

The embodiment shown in FIG. 1A1 through FIG. 1A6 is merely one example of a technique for applying a steganographic message to an electronically stored information object (e.g., image). Specifically, view 1A100 illustrates a two-dimensional ("2D") barcode comprising a matrix of squares, each representing a bit of binary data. For example, as shown, a black square can represent a binary value of 1, and a white square can represent a binary value of 0. A 2D barcode size of 6×6 is shown, but other sizes are possible. For example, a 40×40 (e.g., 160 bits) 2D barcode comprising a steganographic message site having a payload representing the 160 bits of a SHA-1 hash value can be applied to an object. Various attributes (e.g., user identifier or employee ID, or file identifier or device identifier, etc.) to be included in a steganographic message can be encrypted (e.g., hashed) and encoded in a steganographic message site (e.g., 2D barcode) that can be applied to a "carrier" object, such as the image illustrated in view 1A200.

The steganographic message site (e.g., 2D barcode) can be repeated to fit the carrier object, such as is shown in view 1A300 and view 1A400. Multiple sites can, in part, increase the probability of recovery of the steganographic message, particularly when a portion of the protected object is recovered. For example, many sites (e.g., tiles) might be applied to a large 8000×8000 pixel X-ray image, yet just one site might be applied to a thumbnail preview. In other cases, the site pattern can comprise different 2D barcodes. For example, the steganographic message payload can include a cyclical redundancy code and/or be multiplied by a pseudorandom sequence (e.g., a rotating pseudorandom sequence, or use of direct sequence spread spectrum "chip" techniques) to generate multiple 2D barcodes that can be applied to the carrier object. In such cases, the randomness of the injected noise is enhanced, yet recovery of one barcode from among a tiled region can be used to predict (e.g., confirm) that the correct rotating sequence or "chip" has been identified.

The encoded data (e.g., binary information) in the 2D barcode sites can be applied to the carrier object using various techniques. According to one or more embodiments, for example, a protected object can be generated by modifying the pixel data in the carrier object according to the value of the barcode square at each pixel location. Specifically, when a given pixel maps to a black barcode square, the least significant bit ("LSB") of the pixel data associated with the red, green, and blue ("RGB") channels in the protected object can be set to 1. Further, when a pixel maps to a white barcode square, the LSB of the pixel data associated with the RGB channels in the protected object can be set to 0. Since only the LSBs of the RGB channels are being modified, and the original LSBs have an equal probability of being 1 or 0 the applied barcode information can be difficult to perceive by the human eye, yet still be detectable electronically, as shown in view 1A500 and view 1A600. In other embodiments, such as those pertaining to multilayer objects (e.g., portable document format or PDF objects), the steganographic message can be embedded in a mask layer and combined (e.g., flattened) with the carrier object in a carrier layer to generate a protected object.

In some cases, the repeating patterns involved in tiling of 2D barcode sites can be easily detected by the human eye. To ameliorate this, some techniques partition a carrier object into an array of candidate sites (e.g., an array of adjacent rectangular sites sufficiently large to hold a steganographic 2D barcode or other steganographic message). Each candidate site is tested to determine if there is sufficient variation in the site such that application of the steganographic message would not be easily detected by the human eye, and if so, then that candidate site is used to hold the steganographic message. If there is not sufficient variation in the site (e.g., as in a substantially all white region or as in a substantially all black region, or as in a relatively uniform area such as a patch of sky, etc.) such that application of the steganographic message would be easily detected by the human eye, then that candidate site is skipped and the site is not modified with the steganographic message. The decision to apply the steganographic message to a candidate site, or to skip a candidate site can be made on the basis of quantitative metrics and a quantitative threshold that is calibrated to correspond to human visual perception. For example, if the candidate site has a quantitatively low degree of variation (e.g., as would be the case of a substantially all white region or a substantially all black region), then the site is not modified with the steganographic message. A quantitative threshold (e.g., a calibrated quantitative threshold) can be used to deem a candidate site as having either a quantitatively low degree of variation or a quantitatively high degree of variation.

Other steganographic message application techniques can be used in the herein-disclosed systems and environments for detecting disclosed content sources using dynamic steganography. Examples of such techniques (e.g., using redundancy and quantization relationships) are discussed in FIG. 1B and FIG. 1C.

FIG. 1B presents a content-based steganographic message application technique 1B00 as used in systems for detecting disclosed content sources using dynamic steganography. As an option, the content-based steganographic message application technique 1B00 or any aspect thereof may be implemented in the context of the architecture and functionality of the embodiments described herein. Also, the content-based steganographic message application technique 1B00 or any aspect thereof may be implemented in any desired environment.

Specifically, FIG. 1B depicts a carrier object 162 comprising various partitions such as content-based partitions (e.g., video, image, text, white space, etc.). For example, the carrier object 162 might be analyzed electronically to determine such content-based partitions. FIG. 1B further illustrates a redundancy and quantization relationship 164, describing an association between the steganographic message site redundancy and the content color quantization of a given content-based partition. Specifically, as the content color quantization increases, the density of the color distribution (e.g., of the color vector) decreases. For example, a color video might have relatively low quantization as a full spectrum of all colors are used, yet black and white text can have relatively high quantization as only the extremes of the distribution spectrum are used. Further, as the steganographic message site redundancy increases, the number of steganographic message sites applied to a given content-based partition increases. For example, a low quantity of steganographic message sites in a given partition area might result in a relatively low probability of recovering the steganographic message from all or a portion of the partition area, yet a high quantity of steganographic message sites in a given partition area might result in a relatively high probability of recovering the steganographic message from all or a portion of the partition area.

As shown, a perceivability boundary 165 indicates a tradeoff between the content color quantization of a given content-based partition and the steganographic message site redundancy that can be applied to the content-based partition, yet not be perceivable to the human eye. In this embodiment, in order to remain to the left of the perceivability boundary 165 (e.g., where a steganographic message is not perceivable by the viewer), the steganographic message site redundancy should decrease as the content color quantization increases. For example, the video section of the carrier object 162 might have the highest steganographic message site redundancy, followed by the image section of the carrier object 162. The text section of the carrier object 162 can exhibit a relatively high color content quantization as earlier mentioned, resulting in a relatively lower steganographic message site redundancy so as to remain to the left of the perceivability boundary 165. The white space of the carrier object 162 has the highest content color quantization and might not carry any steganographic message sites. Another technique for applying steganographic messages to content objects is described as pertains to FIG. 1C.

Figure 1C:
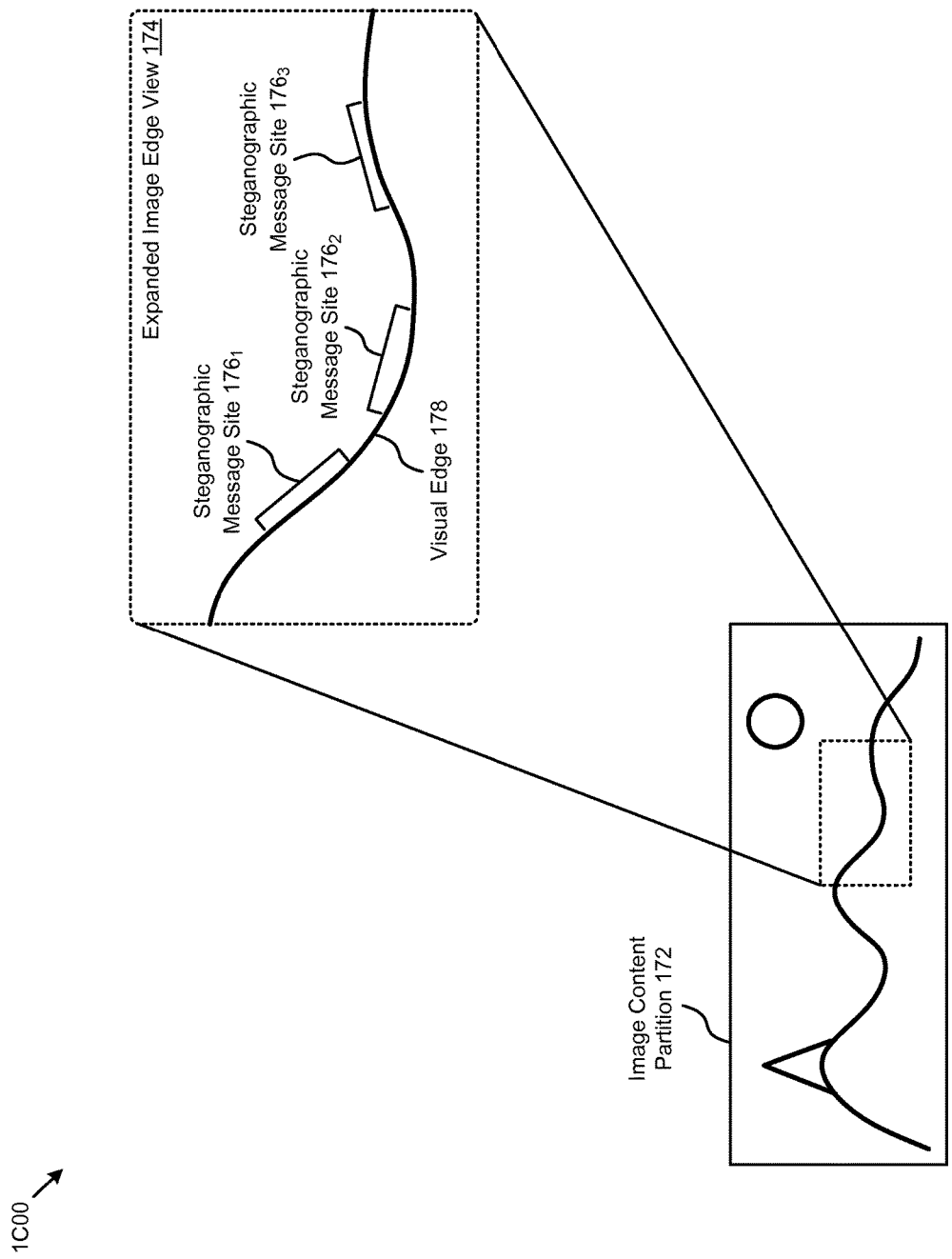
FIG. 1C presents an image edge steganographic message application technique as used in systems for detecting disclosed content sources using dynamic steganography, according to some embodiments.

FIG. 1C presents an image edge steganographic message application technique 1C00 as used in systems for detecting disclosed content sources using dynamic steganography. As an option, the image edge steganographic message application technique 1C00 or any aspect thereof may be implemented in the context of the architecture and functionality of the embodiments described herein. Also, the image edge steganographic message application technique 1C00 or any aspect thereof may be implemented in any desired environment.

FIG. 1C depicts an expanded image edge view 174 of an image content partition 172. For example, the lines in the image content partition 172 might represent visual edges detected by any known-in-the-art edge detection technique. The expanded image edge view 174 can then depict a portion of a visual edge 178 present in the image content partition 172. According to the image edge steganographic message application technique 1C00, a steganographic message can be encoded in the pixels near the visual edge 178 so as to obfuscate human detectability. In some cases, multiple steganographic message sites (e.g., steganographic message site $176_1$, steganographic message site $176_2$, and steganographic message site $176_3$) can be applied to the visual edge 178 to increase the probability of recovering the steganographic message from a recovered portion of the image content partition 172. Environments suitable for implementing the aforementioned dynamic steganographic message application techniques are discussed hereunder.

FIG. 1D1 presents a cloud-based environment 1D100 having a cloud-based shared content management platform to implement detection of disclosed content sources using dynamic steganography, according to an embodiment. As an option, one or more instances of cloud-based environment 1D100 or any aspect thereof may be implemented in the context of the architecture and functionality of the embodiments described herein.

As shown, certain users (e.g., collaborators 118) having various collaboration roles (e.g., user collaborator $123_1$, administrator collaborator $124_1$, creator collaborator $125_1$, etc.) can use one or more instances a variety of user devices 102 to interact with one or more workspaces (e.g., workspace $122_1$, workspace $122_2$, etc.) within the cloud-based environment 1D100. The workspaces can be stored in any location, and are at least partially maintained by components within a cloud-based shared content storage system 101. The cloud-based shared content storage system 101 supports any variety of processing elements and/or storage devices (e.g., a storage filer, a storage facility, etc.) and/or servers such as a host server 115, a sync server 120, a collaboration server 152, a cloud drive server 158, a content server 154, an origin server 156, etc.

Any of the users can access shared content from the cloud-based shared content storage system 101 without the additional process of manually downloading and storing the file locally on an instance of the user devices 102 (e.g., smart phone $102_1$, tablet $102_2$, IP phone $102_3$, laptop $102_4$, workstation $102_5$, laptop $102_6$, etc.). For example, a file (e.g., slide presentation) created by the creator collaborator $125_1$ might be viewed by the user collaborator $123_1$ in a read-only mode, even without informing the user collaborator $123_1$ where the file is stored or without prompting the user collaborator $123_1$ for a directory in which to access the file. Such a facility streamlines many frequently repeated sharing and collaboration processes.

Functions and techniques performed by the cloud-based shared content storage system 101 and/or the client side components (e.g., user devices 102, a sync client on an instance of the user devices 102, etc.) are described herein with further details and with reference to several examples.

Figure 2:
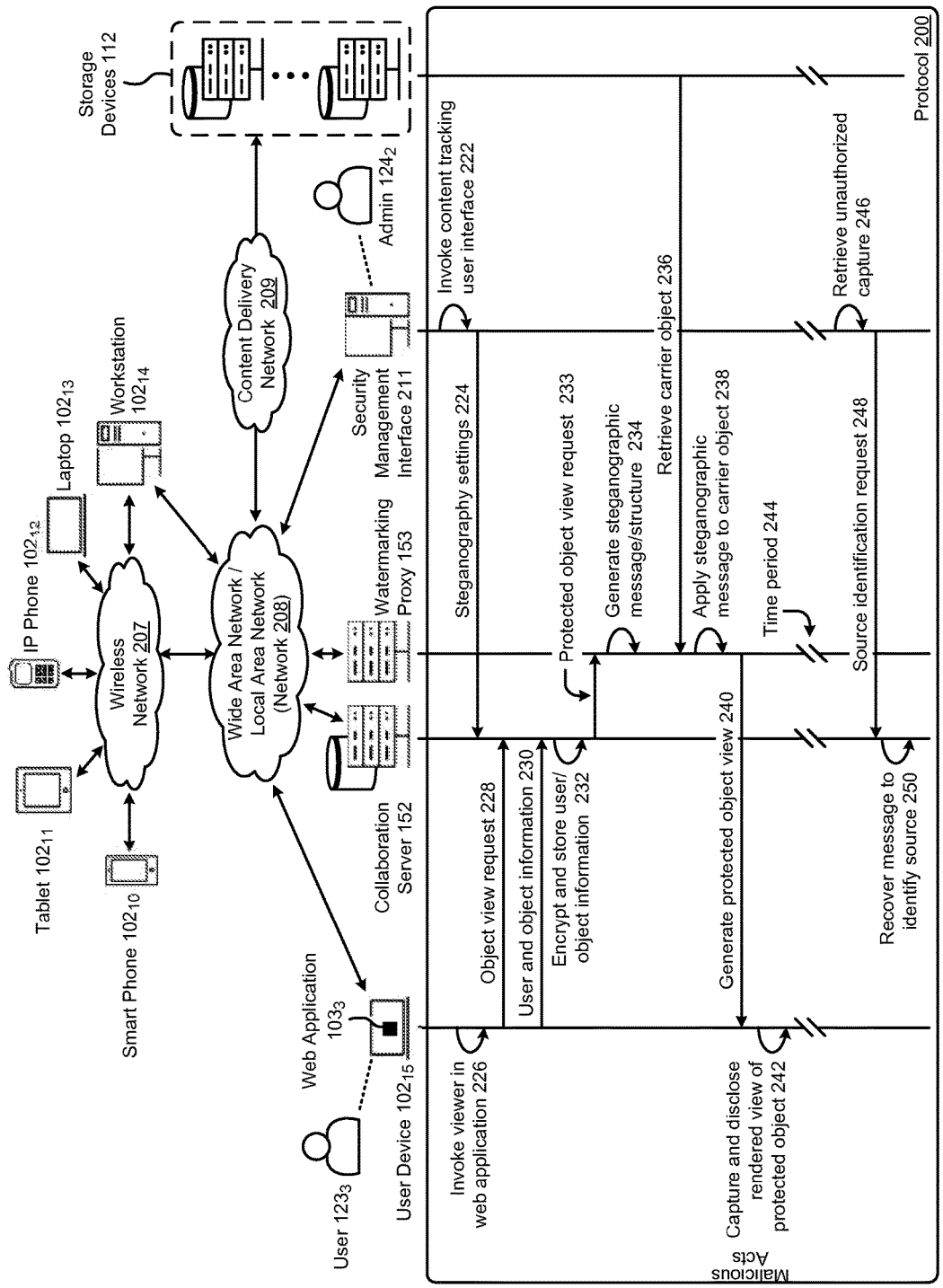

FIG. 1D2 presents a schematic view of the cloud-based environment 1D200 having workspaces that include dynamically-created content that is generated when implementing detection of disclosed content sources using dynamic steganography.

The embodiment shown in FIG. 1D2 is merely one example implementation of the cloud-based environment 1D200 where two or more of the collaborators 118 share an object (e.g., document, image, etc.), and where each collaborator has a certain view of the shared object in respective collaborator-specific workspace (e.g., workspace $122_1$, workspace $122_2$, etc.). Moreover, a collaborator (e.g., the user collaborator $123_1$, the administrator collaborator $124_1$, and the creator collaborator $125_1$) has an associated profile (e.g., a role profile $127_1$, a role profile $127_2$, and a role profile $127_3$, respectively). Such an associated profile can comprise certain attributes such as user information (e.g., user ID, device ID, etc.) and/or user workspace metadata (e.g., file ID, etc.) and/or access permissions and/or role descriptions. One or more roles can be associated with one or more access configurations, and such roles and/or access configurations can be used in determining rules pertaining to how users share documents. Moreover, such roles and/or access configurations can be used in determining how users can view, preview, download, sync, print, and otherwise access shared documents.

The embodiment shown in FIG. 1D2 indicates certain operations corresponding to viewing shared objects that are protected with dynamically generated and applied steganographic messages. For example, shared protected objects having steganographic messages encoded in one or more message sites are shown within workspace $122_1$. Also, shared protected objects having steganographic messages encoded in one or more document layers are shown in workspace $122_2$. As further shown, the collaborators 118 can view such protected objects and, in some cases, capture a copy (e.g., with a screen capture) of the protected object. In such cases, the owner (e.g., creator collaborator $125_1$) might want to identify the source of the captured copy when the copy is disclosed to unauthorized parties. This problem of discovering the source of leaked content that has been disclosed in the form of a screen capture of the content is addressed by the aforementioned techniques for applying dynamic steganography to shared objects, and other techniques described herein.

FIG. 1E1 is a schematic view of a data flow 1E100 to implement techniques for detecting disclosed content sources using dynamic steganography. As an option, the data flow 1E100 or any aspect thereof may be implemented in the context of the architecture and functionality of the embodiments described herein. Also, the data flow 1E100 or any aspect thereof may be implemented in any desired environment.

The shown data flow 1E100 implements collaboration when securely sharing sensitive, electronically stored information objects (e.g., files, images, etc.). Collaborative object sharing can take place concurrently with other accesses in multiple concurrent sessions involving multiple, concurrently sharing users. Dynamically generating and applying steganographic messages to objects and other operations can be performed by a watermarking proxy 153. Such a proxy server can manipulate object representations (e.g., protected objects, views, previews, etc.) rather than manipulating the shared object source. Such manipulations or other operations can be employed in combinations with techniques to detect disclosed content sources using dynamic steganography.

Specifically, for example, a creator or owner (e.g., a creator collaborator $125_2$) of a sensitive object, such as a financial forecast, might want to share the forecast with certain users (e.g., user collaborator $123_2$), such as certain need-to-know employees. The creator collaborator $125_2$ might employ a cloud-based shared content storage service that might use the collaboration server 152 to store the forecast object (e.g., a PowerPoint presentation) on storage devices 112 so as to make them available to the need-to-know employees. The collaboration server 152 can further interface with the watermarking proxy 153 to assist in secure sharing and tracking of the sensitive forecast object. The creator collaborator $125_2$ and the user collaborator $123_2$ can interact with the cloud-based shared content storage service using web applications (e.g., web application $103_1$, web application $103_2$, etc.) operating on various instances of user devices 102 (e.g., user device $102_8$, user device $102_9$, etc.). Such web applications can communicate with the collaboration server 152 to invoke and execute certain operations (e.g., content uploads, content downloads, content viewing, content tracking, etc.) provided by the cloud-based shared content storage service. In some cases, as shown, the web applications might communicate with the watermarking proxy 153.

More specifically, in the aforementioned forecast sharing example, the creator collaborator $125_2$ might invoke a sharing session 173 at the collaboration server 152 and invite the user collaborator $123_2$ to join to view the financial forecast presentation. In this case, the forecast can be view by the user collaborator $123_2$, yet the user collaborator $123_2$ is not authorized to copy and/or disclose the sensitive content. In response to accepting the invitation to join the sharing session 173, a viewing session 175 for the user collaborator $123_2$ can be invoked by the collaboration server 152. According to the herein disclosed techniques, when the creator collaborator $125_2$ selects a presentation slide for viewing, the watermarking proxy 153 can apply a steganographic message to the slide view to be presented (e.g., rendered) to the web application $103_2$ of the user collaborator $123_2$. As an example, the steganographic message might comprise the user ID of the user collaborator $123_2$, the file ID of, for instance, a financial forecast object, and other attributes. In some cases, the attributes included in the role profile (e.g., role profile $127_1$, role profile $127_2$, ..., role profile $127_N$) associated with the user collaborator $123_2$ can be included in the steganographic message. If the user collaborator $123_2$ captures and discloses the viewed protected object, and at least a portion of the captured protected object is later recovered, the applied steganographic message can be extracted to determine the source (e.g., user collaborator 123$_2$) of the leaked forecast. One embodiment of a role profile data structure that can be used to generate a steganographic message according to the herein disclosed techniques is discussed in FIG. 1E2.

FIG. 1E2 shows role profile data structures 1E200 used to dynamically generate steganography messages in systems for detecting disclosed content sources using dynamic steganography. As an option, one or more instances of the role profile data structures 1E200 or any aspect thereof may be implemented in the context of the architecture and functionality of the embodiments described herein. Also, the role profile data structures 1E200 or any aspect thereof may be implemented in any desired environment.

The embodiment shown in FIG. 1E2 is one example of a data structure that can be used for recording and associating various attributes with users in a cloud-based shared content storage environment. One or more of such attributes can be included in dynamically generated steganographic messages used in the herein disclosed techniques. Specifically, the role profile data structures 1E200 shows each data record (e.g., row) in the data table comprising a "User ID" field, a "Device ID" field, a "User Hash" field, a "File ID" field, a "Steganography Method" field, and a "Steganography Hash" field. The fields are representative of a possible data structure and the number and name of the fields can vary. The "User ID" field can represent a unique key or identifier of the data record. The "Device ID" field can represent the unique identifier of a particular instance of the user devices 102 (e.g., the "Device ID") that can be associated with the "User ID". The "User Hash" field can represent the hash value (e.g., from a SHA-1 hash function) of personally identifiable information (e.g., email address, phone number, name, etc.) about a certain user. Such information can be hashed for security purposes. For example, as shown, a certain user represented by a "User Hash" of "npc07 . . . " might be determined to be associated with a "Device ID" of "DID1" and assigned a unique "User ID" of "UIDA".

According to the herein disclosed techniques, when user "UIDA" requests to view a particular sensitive object (e.g., "File ID"="FIDa1"), a steganographic message can be dynamically generated that can comprise one or more of the attributes (e.g., "User Hash") associated with the requesting user and/or associated with the particular request (e.g., "File ID"). When the steganographic message is generated and applied, the role profile of user "UIDA" might be updated to record the following attributes pertaining to the dynamically generated and applied steganographic message: "File ID"="FIDa1", "Steganography Method"="2DBarcode", "Steganography Hash"="a8a89 . . . ". Other attributes associated with the user and/or the object request in the role profile are possible. In one or more embodiments, the "Steganography Hash" might comprise an encrypted representation of the information specified for encoding in the steganographic message.

The foregoing steganographic message generation, application, and recovery capability can be implemented in a variety of environments, some of which are shown and discussed below.

FIG. 2 depicts a protocol 200 used by cloud-based shared content storage system components for detecting disclosed content sources using dynamic steganography. As an option, one or more variations of protocol 200 or any aspect thereof may be implemented in the context of the architecture and functionality of the embodiments described herein. Also, the protocol 200 or any aspect thereof may be implemented in any environment.

As shown in FIG. 2, the protocol 200 is associated with certain high-level interactions among various computing systems (e.g., servers and devices) interconnected by a wireless network 207, a network 208, and a content delivery network 209. The wireless network 207, the network 208, and the content delivery network 209 can comprise any combination of a wide area network (e.g., WAN), local area network (e.g., LAN), cellular network, wireless LAN (e.g., WLAN), or any components for enabling communication of computing systems. The wireless network 207, the network 208, and the content delivery network 209 can also collectively be referred to as the Internet. The content delivery network 209 can comprise any combination of a public network and a private network. More specifically, the computing systems associated with protocol 200 comprise at least one instance of the collaboration server 152, at least one instance of the watermarking proxy 153, at least one instance of a security management interface 211, and the plurality of storage devices 112. The servers and storage devices shown can represent any single computing system with dedicated hardware and software, multiple computing systems clustered together (e.g., a server farm, a host farm, etc.), a portion of shared resources on one or more computing systems (e.g., virtual server), or any combination thereof. For example, the collaboration server 152 and the storage devices 112 can comprise a cloud-based content management platform that provides shared content management and storage services.

FIG. 2 further comprises an instance of the user devices 102 (e.g., user device 102$_{15}$) that can represent one of a variety of other computing devices (e.g., a smart phone 102$_{10}$, a tablet 102$_{11}$, an IP phone 102$_{12}$, a laptop 102$_{13}$, a workstation 102$_{14}$, etc.) having software (e.g., a web application 103$_3$, etc.) and hardware (e.g., a graphics processing unit, display, monitor, etc.) capable of processing and displaying information (e.g., web page, graphical user interface, etc.) on a display. The user device 102$_{15}$ can further communicate information (e.g., web page request, user activity, electronic files, etc.) over the wireless network 207, the network 208, and the content delivery network 209. As shown, the user device 102$_{15}$ can be operated by a user collaborator such as user 123$_3$. Also, the security management interface 211 can be operated by an administrator collaborator, such as admin 124$_2$.

As shown, the user device 102$_{15}$, the collaboration server 152, the watermarking proxy 153, the security management interface 211, and the storage devices 112 can exhibit certain high-level interactions (e.g., operations, messages, etc.) in the protocol 200. Specifically, the protocol 200 can represent interactions in systems for detecting disclosed content sources using dynamic steganography. As shown, the admin 124$_2$ can invoke a content tracking user interface on the security management interface 211 (see operation 222), and upload certain steganography settings to the collaboration server 152 (see message 224). The user 123$_3$ can also invoke a viewer in the web application 103$_3$ on user device 102$_{15}$ (see operation 226) and issue to the collaboration server 152 a request to view an object (see message 228). In response, the collaboration server 152 can receive user and object information (see message 230), and encrypt and store such information (see operation 232). For example, the collaboration server 152 might receive and store attributes in a role profile as described in FIG. 1E2. The collaboration server 152 can then issue a request to the watermarking proxy 153 to generate a protected object for user 123$_3$ (see message 233). Such a request can include the user and object information stored in operation 232. The watermarking proxy 153 can then generate one or more steganographic messages and structures (e.g., 2D barcode, mask layer, etc.) based in part on the request in message 233 (see operation 234). For example, the steganographic message can be based on at least a portion of the attributes comprising the user and object information associated with the object request. The watermarking proxy 153 can then retrieve the carrier object (see message 236) and apply the steganographic message to the carrier object (see operation 238) to dynamically generate a protected object for viewing by user $123_3$ (see message 240). Upon viewing the protected object, user $123_3$ might invoke a screen capture of the rendered view of the protected object and disclose the captured image to unauthorized parties (see operation 242). After a time period 244, the creator and/or owner of the protected object (e.g., admin $124_2$) can retrieve the unauthorized capture for analysis (see operation 246) and issue a request to the collaboration server 152 to identify the source of the leak (see operation 248). In some cases, the retrieved unauthorized capture can have variations (e.g., resolution, scale, cropping, completeness, etc.) as compared to the rendered view of the protected object. The collaboration server 152 can employ the herein disclosed techniques to recover the steganographic message from the retrieved capture (see operation 250) to identify the source (e.g., user $123_3$). Some of such techniques are discussed in detail below.

Figure 3A:
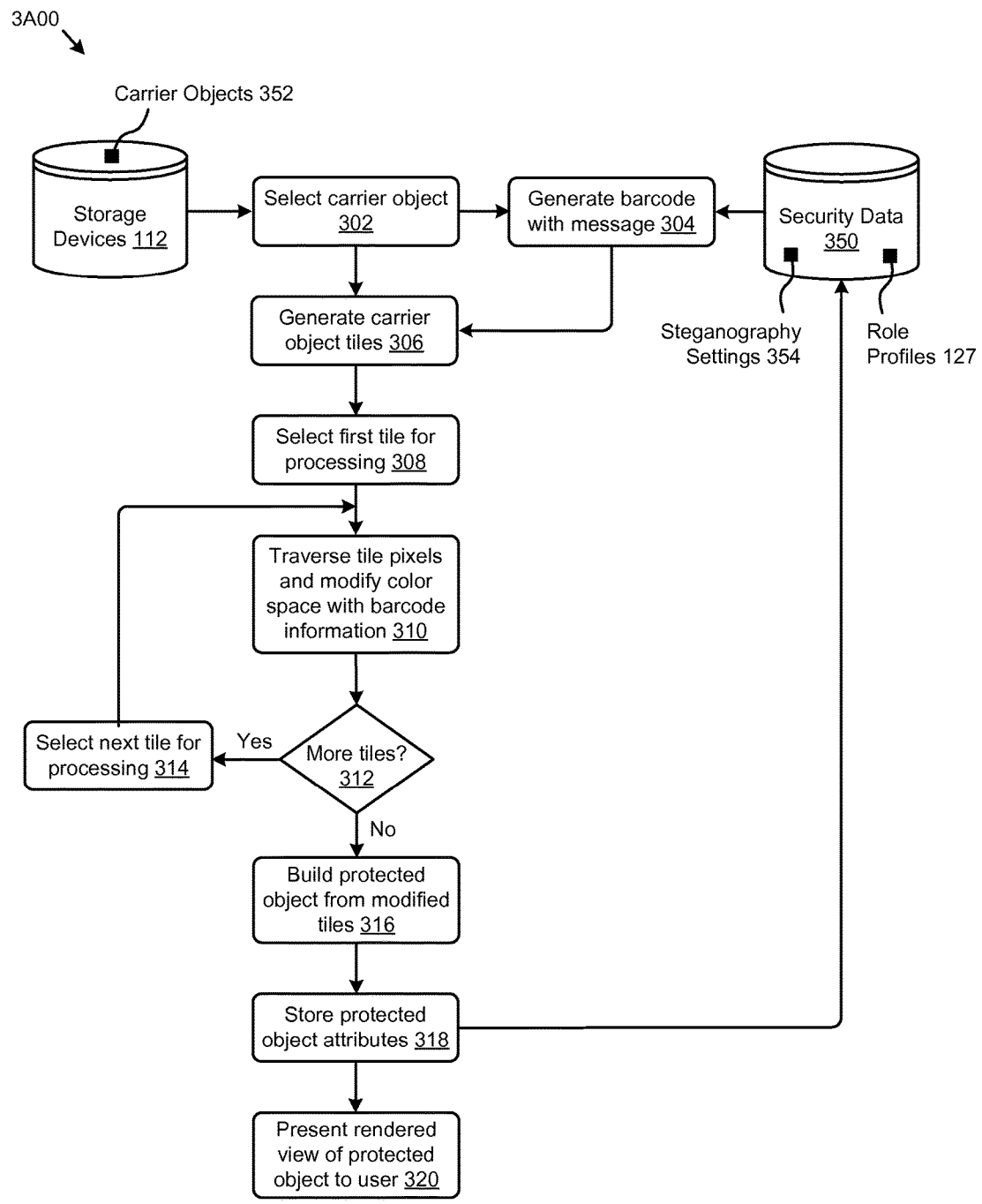
FIG. 3A is a flow diagram of a data flow for injection of a steganographic message information into source material using a two-dimensional barcode as used in systems for detecting disclosed content sources using dynamic steganography, according to some embodiments.

FIG. 3A is a flow diagram of a data flow 3A00 for injection of a steganographic message information into source material using a two-dimensional barcode. As an option, one or more variations of data flow 3A00 or any aspect thereof may be implemented in the context of the architecture and functionality of the embodiments described herein. Also, the data flow 3A00 or any aspect thereof may be implemented in any environment.

The data flow 3A00 presents one embodiment of certain steps for injection of a steganographic message information into source material (e.g., objects, carrier objects, etc.) using a two-dimensional barcode. In one or more embodiments, the steps and underlying operations shown in data flow 3A00 can be executed by the watermarking proxy. The data flow 3A00 depicts the storage devices 112 that can store certain carrier objects 352. A storage device holding any of forms of security data 350 is provided. As shown security data 350 comprises certain steganography settings 354 and the role profiles 127. For example, the steganography settings 354 can be uploaded by a content creator and/or owner (e.g., admin $124_2$) from a content tracking user interface (e.g., operating on security management interface 211).

Specifically, the data flow 3A00 starts with selecting a carrier object (e.g., specified for viewing by a requesting user) from the carrier objects 352 (see step 302). In response to step 302, a 2D barcode encoding a certain steganographic message can be generated (see step 304). For example, the steganographic message might be derived from an instance of the role profiles 127 associated with the requesting user. The structure (e.g., encoding, size, etc.) of the steganographic message and/or 2D barcode can further be derived from the steganography settings 354 associated with the request. For example, a certain document type and size combination might satisfy a rule that specifies constraints on the number of bits that can be included in the steganographic message and 2D barcode. When the barcode size is determined, the carrier object can be partitioned into tiles of a size corresponding to the barcode size (see step 306), and a first tile selected for processing (see step 308). Specifically, the pixels of the selected tile can be traversed and the color space of each pixel can be modified according to the generated 2D barcode (see step 310). For example, the LSB of the RGB channels of each pixel in the carrier object can be modified according to the value of the barcode square at that pixel location (see FIG. 1A1 through FIG. 1F). If more tiles remain to be processed (see decision 312), then a next tile can be selected (see step 314) and step 310 can be repeated.

When all tiles have been processed, a protected object can be built from the modified tiles (see step 316). Certain attributes associated with the protected object can then be stored (see step 318). For example, the role profile associated with the requesting user can be updated with attributes such as "File ID", "Steganography Method", "Steganography Hash", and other attributes describing the protected object (see FIG. 1E2). Such attributes can, in part, enable identification of the requesting user should the requesting user capture and disclose the rendered view of the protected object (see step 320).

Figure 3B:
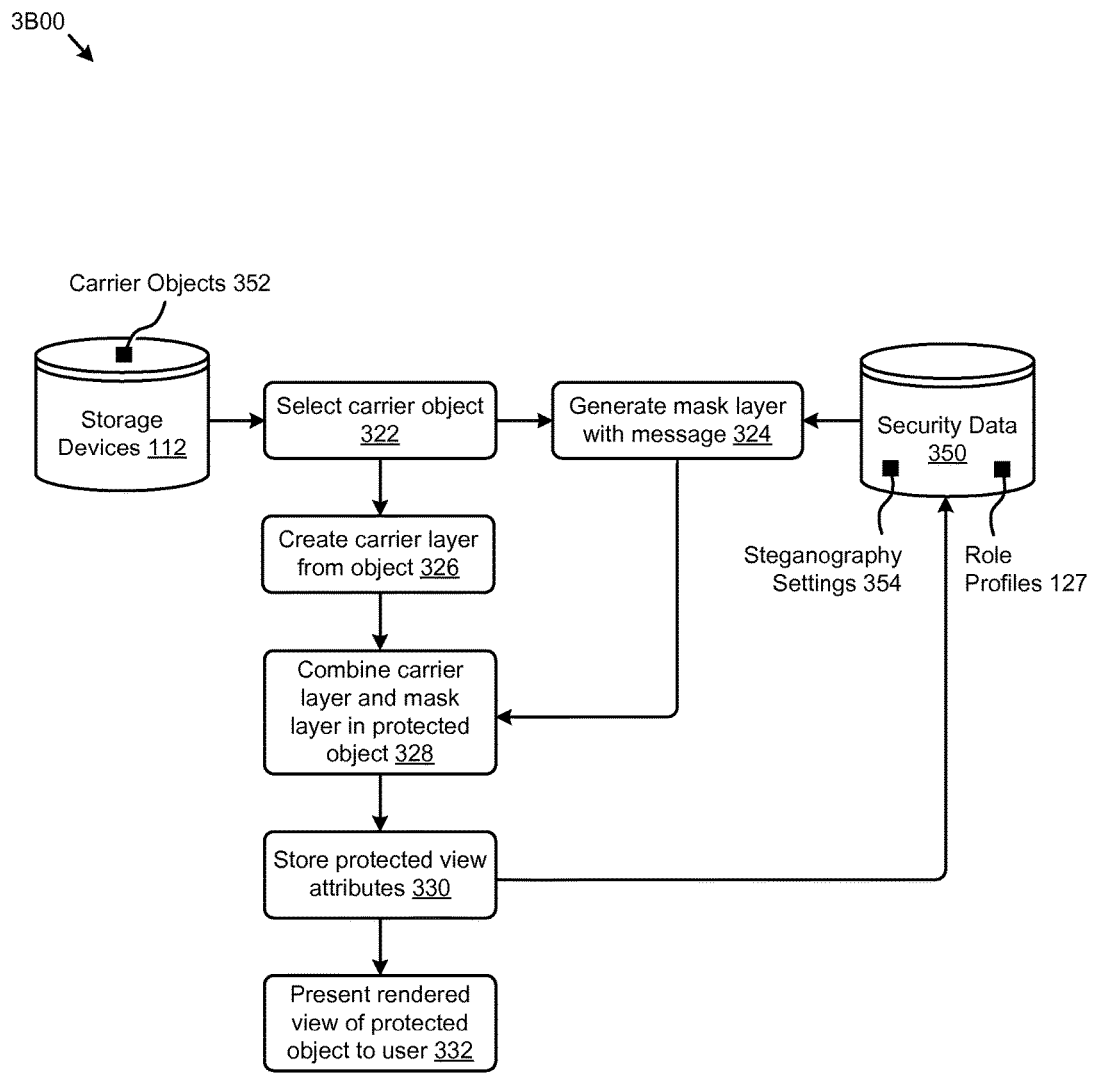
FIG. 3B is a flow diagram of a data flow for injection of a steganographic message information into source material using a portable document format (PDF) as used in systems for detecting disclosed content sources using dynamic steganography, according to an embodiment.

FIG. 3B is a flow diagram of a data flow 3B00 for injection of a steganographic message information into source material using a portable document format (PDF) as used in systems for detecting disclosed content sources using dynamic steganography. As an option, one or more instances of data flow 3B00 or any aspect thereof may be implemented in the context of the architecture and functionality of the embodiments described herein. Also, the data flow 3B00 or any aspect thereof may be implemented in any environment.

The data flow 3B00 presents one embodiment of certain steps for injection of a steganographic message information into source material (e.g., objects, carrier objects, etc.) using a PDF. In one or more embodiments, the steps and underlying operations shown in data flow 3B00 can be executed by the watermarking proxy. The data flow 3B00 further depicts the storage devices 112, storing certain carrier objects 352, and the security data 350 comprising certain steganography settings 354 and role profiles 127.

Specifically, the data flow 3B00 starts with selecting a carrier object (e.g., specified for viewing by a requesting user) from the carrier objects 352 (see step 322). In response to step 322, a mask layer (e.g., for the target protected object) encoding a certain steganographic message can be generated (see step 324). For example, the steganographic message might be derived from an instance of the role profiles 127 associated with the requesting user. The structure (e.g., encoding, size, etc.) of the steganographic message and/or the mask layer can further be derived from the steganography settings 354 associated with the request. For example, a certain document type and size combination might satisfy a rule that specifies constraints on the number of bits that can be included in the steganographic message. As another example, the document size might be used to determine an encoding type (e.g., 2D barcode) and pattern (e.g., repeated tile pattern) used for encoding the steganographic message in the mask layer. A carrier layer for the target protected object can also be generated from the carrier object (see step 326), and the carrier layer and the mask layer can be combined (e.g., flattened) to form a protected object (see step 328). Certain attributes associated with the protected object can then be stored (see step 330). For example, the role profile associated with the requesting user can be updated with attributes such as "File ID", "Steganography Method", "Steganography Hash", and other attributes describing the protected object (see FIG. 1E2). Such attributes can be used to enable identification of the requesting user should the requesting user capture and disclose the rendered view (e.g., with blended layers) of the protected object (see step 332).

Figure 3C:
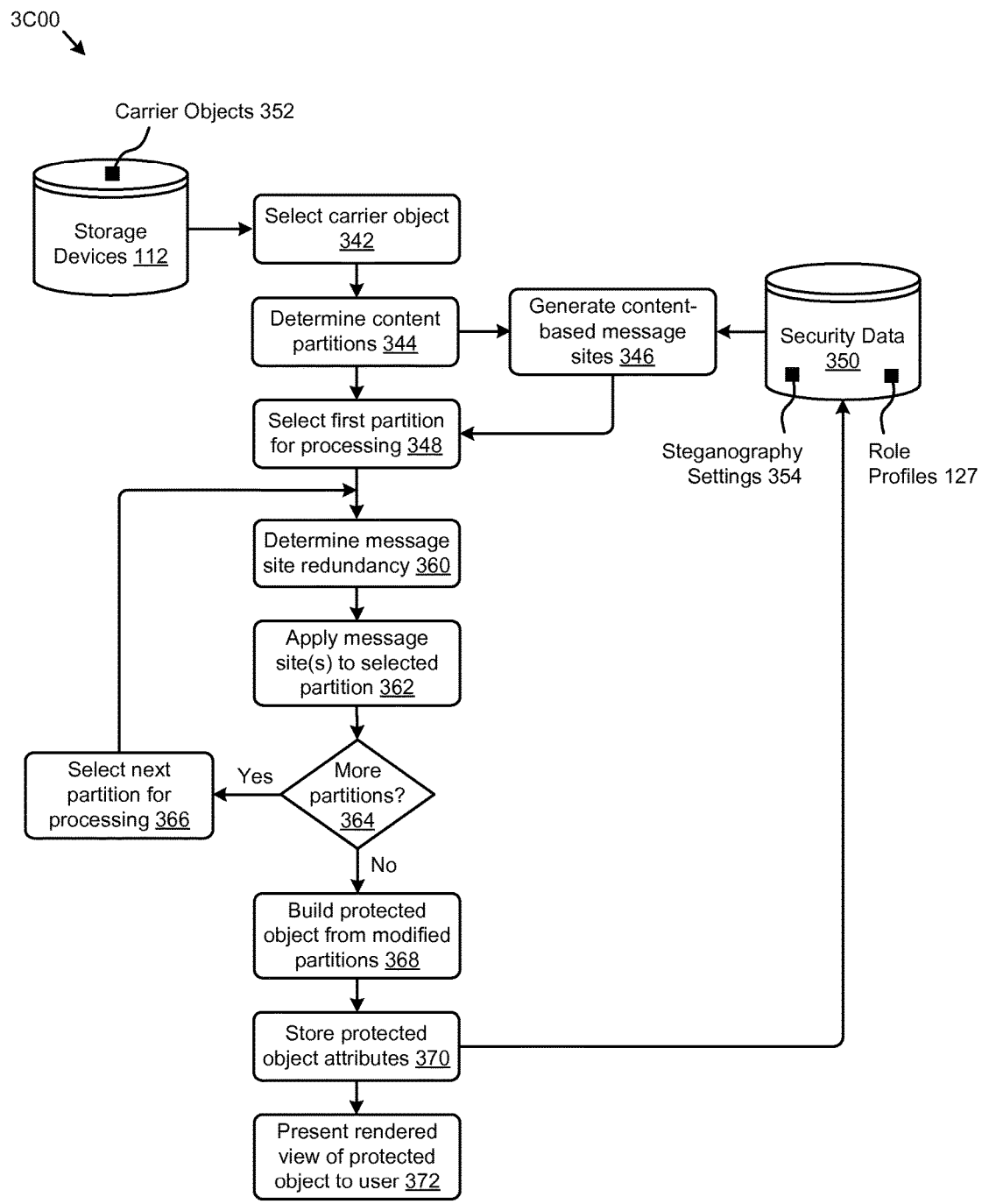
FIG. 3C is a flow diagram of a data flow for content-based injection of a steganographic message information into source material using a two-dimensional barcode as used in systems for detecting disclosed content sources using dynamic steganography, according to some embodiments.

FIG. 3C is a flow diagram of a data flow 3C00 for content-based injection of a steganographic message information into source material using a two-dimensional barcode. As an option, one or more variations of data flow 3C00 or any aspect thereof may be implemented in the context of the architecture and functionality of the embodiments described herein. Also, the data flow 3C00 or any aspect thereof may be implemented in any environment.

The data flow 3C00 presents one embodiment of certain steps for injection of a steganographic message information into source material (e.g., objects, carrier objects, etc.) based on the content comprising the source material. In one or more embodiments, the steps and underlying operations shown in data flow 3C00 can be executed by the watermarking proxy 153 in FIG. 1E1. The data flow 3C00 depicts the storage devices 112 that can store certain carrier objects 352. A storage device holding any form of security data 350 is provided. As shown security data 350 comprises certain steganography settings 354 and role profiles 127. For example, the steganography settings 354 can be uploaded by a content creator and/or owner (e.g., admin 124$_2$) from a content tracking user interface (e.g., operating on security management interface 211).

Specifically, the data flow 3C00 might commence with selecting a carrier object (e.g., specified for viewing by a requesting user) from the carrier objects 352 (see step 342). The selected carrier object can be analyzed to determine one or more content partitions comprising the selected carrier object (see step 344). For example, the selected carrier object might comprise one or more video partitions, one or more image partitions, and one or more text partitions. In response to step 344, a content-based steganographic message site can be generated (see step 346). For example, the steganographic message site might encode attributes associated with an instance of the role profiles 127 associated with the requesting user. The structure (e.g., encoding, size, etc.) of the steganographic message site can be based on the various content partitions identified and/or from the steganography settings 354 associated with the request. For example, a certain content type (e.g., image, video, text, edge, etc.) and area combination might satisfy a rule that specifies constraints on the number of bits that can be encoded in the encoded data of a given message site. When the content partitions and message sites have been determined, the first partition can be selected for processing (see step 348). Specifically, a certain level of message site redundancy can be determined for the selected partition (see step 360) based, in part, on the expected perceivability of the steganographic message in the selected partition (see FIG. 1B). The content-based message site can then be applied at the determined level of redundancy (see step 362). If more content partitions of the selected carrier object remain to be processed (see decision 364), then a next partition can be selected (see step 366) and step 360 and step 362 can be repeated.

When all partitions have been processed, a protected object can be built from the modified partitions (see step 368). Certain attributes associated with the protected object can then be stored (see step 370). For example, the role profile associated with the requesting user can be updated with attributes such as "File ID", "Steganography Method", "Steganography Hash", and other attributes describing the protected object (see FIG. 1E2). Such attributes can, in part, enable identification of the requesting user should the requesting user capture and disclose the rendered view of the protected object (see step 372). One technique for recovering the steganographic message to identify the disclosing source is described as pertains to FIG. 4.

Figure 4:
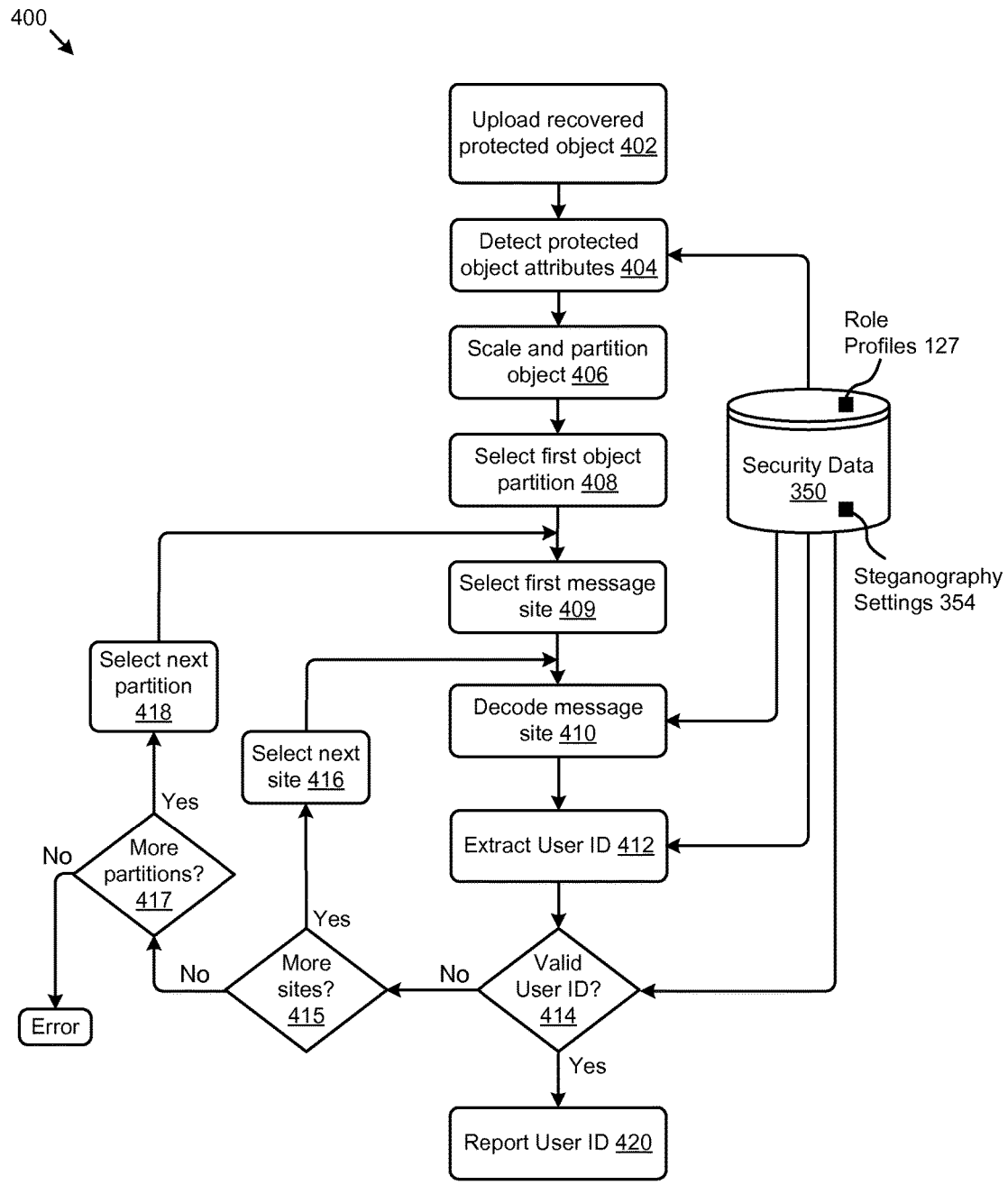
FIG. 4 presents a flow diagram of a steganographic information recovery technique as used in systems for detecting disclosed content sources using dynamic steganography, according to some embodiments.

FIG. 4 presents a flow diagram of a steganographic information recovery technique 400 as used in systems for detecting disclosed content sources using dynamic steganography. As an option, one or more instances of steganographic information recovery technique 400 or any aspect thereof may be implemented in the context of the architecture and functionality of the embodiments described herein. Also, the steganographic information recovery technique 400 or any aspect thereof may be implemented in any environment.

The steganographic information recovery technique 400 presents one embodiment of certain steps for recovering steganographic message information from a retrieved version of a protected object disclosed by an unauthorized source. For example, the steganographic information recovery technique 400 can be implemented in embodiments that use one or more 2D barcodes to encode the steganographic message in a protected object. The steganographic information recovery technique 400 can further be applied to other encoding techniques. In one or more embodiments, the steps and underlying operations shown in FIG. 4 can be executed by the various environments and systems described herein. As shown, the steganographic information recovery technique 400 further references the security data 350 comprising certain steganography settings 354 and role profiles 127.

The steganographic information recovery technique 400 can commence with uploading a recovered protected object (see step 402). Certain protected object attributes (e.g., encoding method, content-based rules, protected object original size, etc.) associated with an original protected object can be retrieved from the security data 350 (see step 404). Such attributes might be used to scale and partition the recovered protected object for analysis (see step 406). For example, the protected object attributes might comprise the size and or sites of a 2D barcode used to apply the steganographic message, which in turn would facilitate scaling and partitioning of the recovered protected object. In other cases, the protected object attributes might indicate the recovered protected object should be partitioned according to certain content types (e.g., image, text, etc.). Other operations to prepare the recovered protected object for analysis are possible. When the recovered protected object has been scaled and partitioned, a first partition can be selected for processing (see step 408). In some cases, the selected partition might comprise multiple steganographic message sites carrying the encoded steganographic message so as to improve the probability of recovering the steganographic message. In such cases, a first instance of the recovered steganographic message sites can be selected from the selected partition for processing (see step 409). The selected message site (e.g., barcode) associated with the selected partition (e.g., barcode tile) can be decoded (see step 410) and the user information (e.g., user ID) extracted (see step 412) according to the steganography settings 354 associated with the protected object. For a given protected object, a certain barcode size (e.g., bits, dimensions, etc.) and one or more hash keys or secrets (e.g., for the "Steganography Hash", the "User Hash", etc.) might have been used and recorded in the steganography settings 354. In some cases, instances of the steganography settings 354 and/or role profiles 127 can be used to decrypt the underlying information stored in the steganographic message. In some cases, the recovered protected object can be modified from the original such that the steganographic information (e.g., the barcode) can be distorted and the extracted information invalidated. The steganographic information recovery technique 400 can then check that the extracted user ID is valid (see decision 414). If a valid user ID is not extracted and more sites are available in the selected partition (see decision 415), a next message site (e.g., barcode tile) can be selected (see step 416) and the flow can return to step 410. If there are no more message sites to analyze in the selected partition and there are more partitions available in the recovered protected object (see decision 417), a next partition can be selected (see step 418) and the flow can return to step 409. If no partitions remain in the recovered protected object and a valid user ID has not yet been extracted, the flow might return an error. If a valid user ID is extracted (see decision 414), the user ID can be reported to an interested party (see step 420) such as the owner and/or creator of the protected object (e.g., admin $124_2$).

As described herein, the disclosed techniques and systems for detecting disclosed content sources using dynamic steganography can be used by content creators and/or owners sharing sensitive content in a cloud-based shared content storage environment. An embodiment of an interface for interacting with such systems is described as pertains to FIG. 5.

Figure 5:
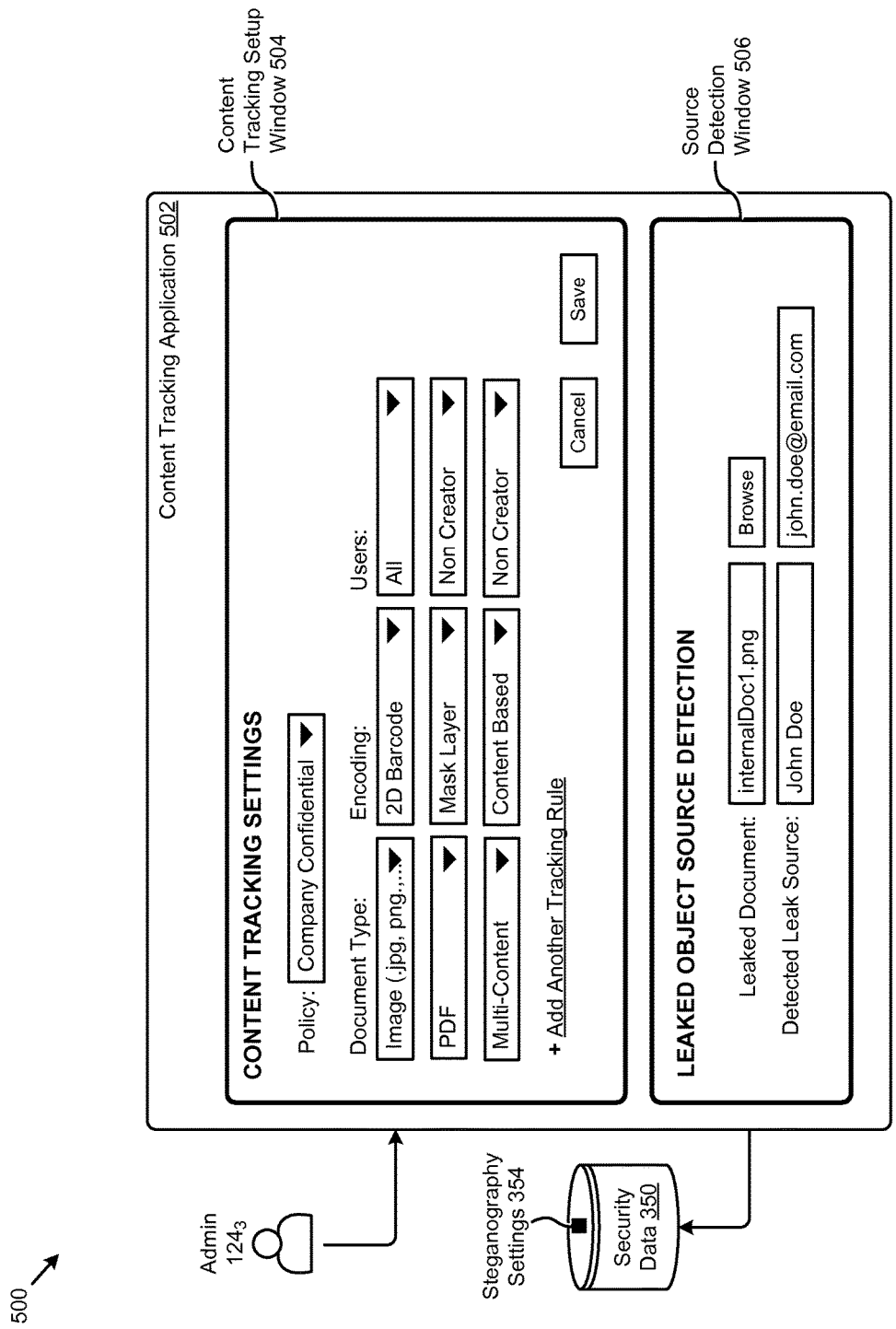
FIG. 5 is a content tracking user interface as used in systems for detecting disclosed content sources using dynamic steganography, according to some embodiments.

FIG. 5 is a content tracking user interface 500 as used in systems for detecting disclosed content sources using dynamic steganography. As an option, one or more instances of content tracking user interface 500 or any aspect thereof may be implemented in the context of the architecture and functionality of the embodiments described herein. Also, the content tracking user interface 500 or any aspect thereof may be implemented in any environment.

Specifically, the content tracking user interface 500 shown in FIG. 5 can be used by an administrator collaborator, such as admin $124_3$, to establish various content tracking rules and settings (e.g., steganography settings 354 of security data 350), invoke the analysis of a recovered protected object for identification of the leak source, and other operations. In one or more embodiments, the content tracking user interface 500 can be included in a content tracking application 502 operating on one or more computing devices (e.g., security management interface 211, an instance of user devices 102, etc.). More specifically, the content tracking user interface 500 can comprise a content tracking setup window 504 and a source detection window 506. As shown, the content tracking setup window 504 can present various input entry elements (e.g., dropdown selections, text boxes, etc.) through which the admin $124_3$ can associate various tracking rules with a given storage and/or sharing and/or collaboration policy. The tracking rules, for example, can further associate an "Encoding" type with a certain "Document Type" for a certain group of "Users". One or more tracking rules can be associated with the given policy as shown. For example, the admin $124_3$ can select a policy "Company Confidential" and specify "2D Barcode" encoding for "Image" objects across "All" users. Further, for the selected "Company Confidential" policy, the admin $124_3$ can select "Mask Layer" encoding for "PDF" objects for "Non Creator" users. Also, the admin $124_3$ can select a "Content Based" encoding technique for objects comprising multiple content types. In such cases, for example, the "Content Based" encoding technique might have certain steganographic message site redundancy levels associated with respective content types (e.g., video, image, text, etc.). More tracking rules can be added to the policy if needed. The specified set of rules associated with the policy can be saved and used to dynamically generate steganographic messages for shared objects according to the herein disclosed techniques. A code other than a barcode can be used, and in some cases error encoding codes and/or interleaving codes can be used.

Further, the source detection window 506 can enable the admin $124_3$ to invoke an analysis of a recovered protected object that has been leaked to determine the source of the leak, according to the herein disclosed techniques. Specifically, the admin $124_3$ can "Browse" and select a recovered protected object for analysis (e.g., "internalDoc1.png"). When the recovered protected object has been selected, a process for extracting the source information (e.g., user ID, etc.) from the recovered protected object can be invoked (see FIG. 4), and source information can be displayed (e.g., "John Doe", "john.doe@email.com").

ADDITIONAL EMBODIMENTS OF THE DISCLOSURE

Additional Practical Application Examples

Figure 6A:
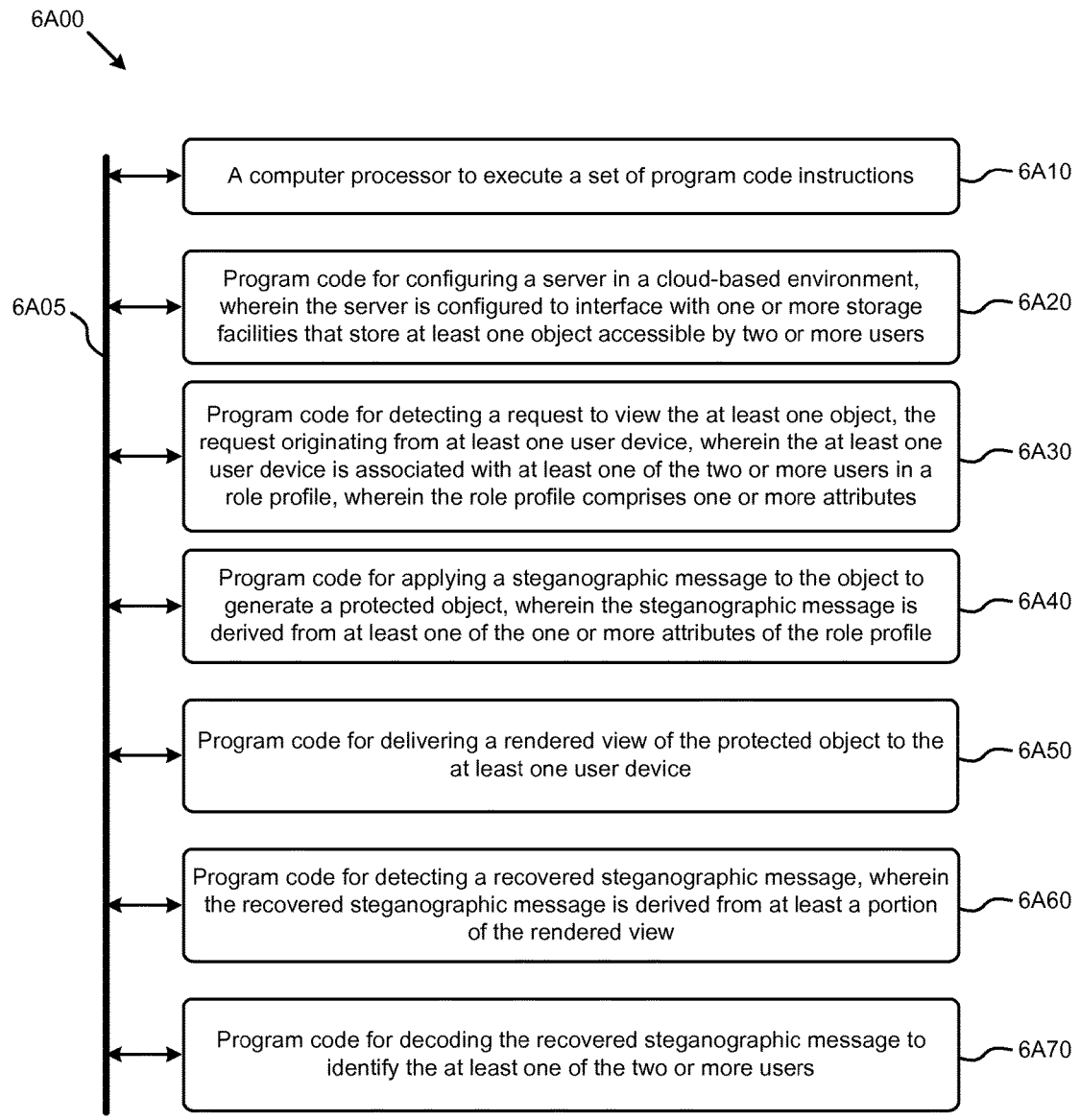
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment. The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims. The shown embodiment implements a portion of a computer system, presented as system 6A00, comprising a computer processor to execute a set of program code instructions (see module 6A10) and modules for accessing memory to hold program code instructions to perform: configuring a server in a cloud-based environment, wherein the server is configured to interface with one or more storage facilities that store at least one object accessible by two or more users (see module 6A20); detecting a request to view the at least one object, the request originating from at least one user device, wherein the at least one user device is associated with at least one of the two or more users in a role profile, and wherein the role profile comprises one or more attributes (see module 6A30); applying a steganographic message to the object to generate a protected object, wherein the steganographic message is derived from at least one of the one or more attributes of the role profile (see module 6A40); and initiating delivery of a rendered view of the protected object to the at least one user device (see module 6A50).

Some embodiments further include operations for detecting a recovered steganographic message, wherein the recovered steganographic message is derived from at least a portion of the rendered view (see module 6A60) and some embodiments further include operations for decoding the recovered steganographic message to identify the at least one of the two or more users (see module 6A70).

Figure 6B:
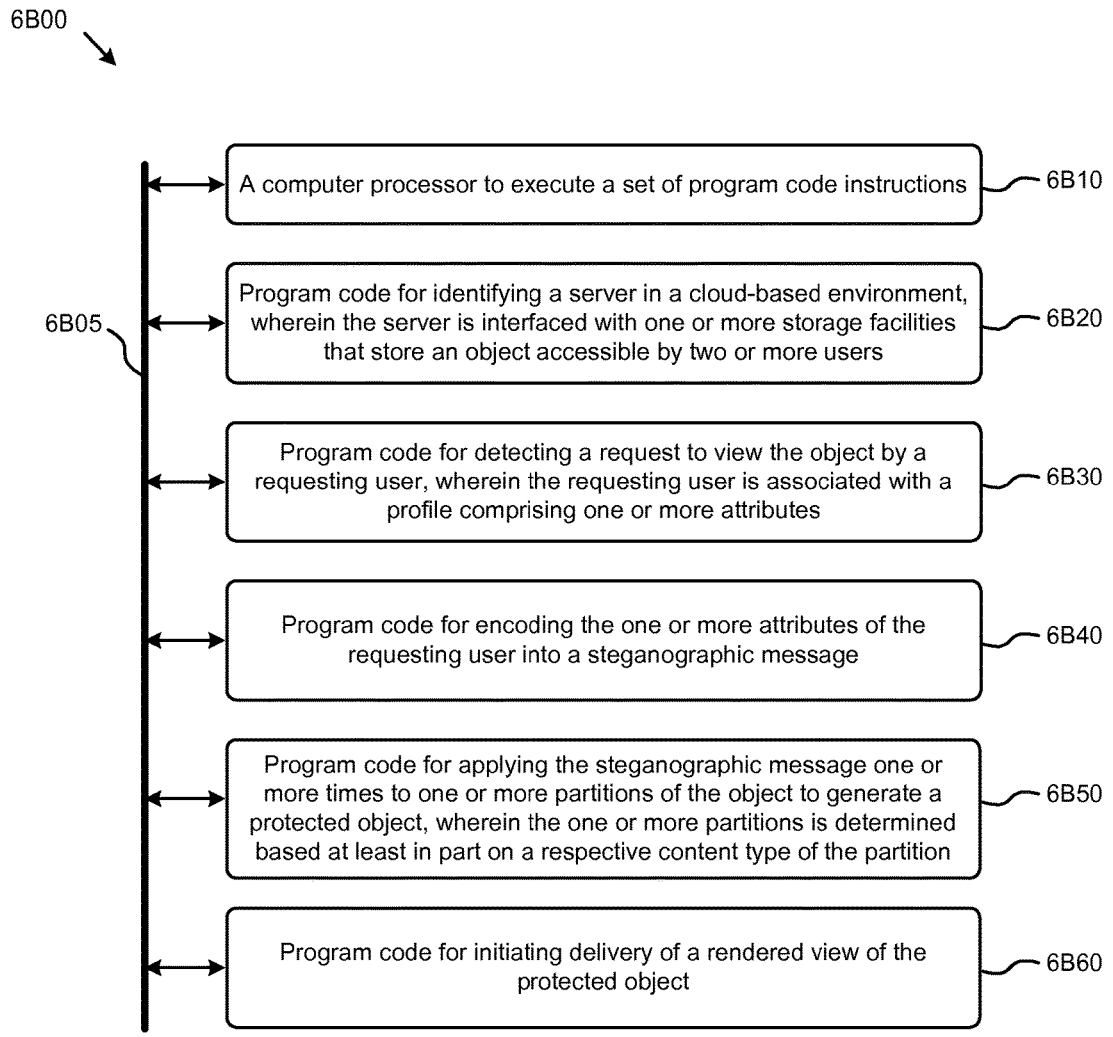

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment.

The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims.

The shown embodiment implements a portion of a computer system, presented as system 6B00, comprising a computer processor to execute a set of program code instructions (see module 6B 10) and modules for accessing memory to hold program code instructions to perform: identifying a server in a cloud-based environment, wherein the server is interfaced with one or more storage facilities that store an object accessible by two or more users (see module 6B20); detecting a request to view the object by a requesting user, wherein the requesting user is associated with a profile comprising one or more attributes (see module 6B30); encoding the one or more attributes of the requesting user into a steganographic message (see module 6B40); applying the steganographic message one or more times to one or more partitions of the object to generate a protected object, wherein the one or more partitions is determined based at least in part on a respective content type of the partition (see module 6B50); and initiating delivery of a rendered view of the protected object (see module 6B60).

SYSTEM ARCHITECTURE OVERVIEW

Additional System Architecture Examples

Figure 7A:
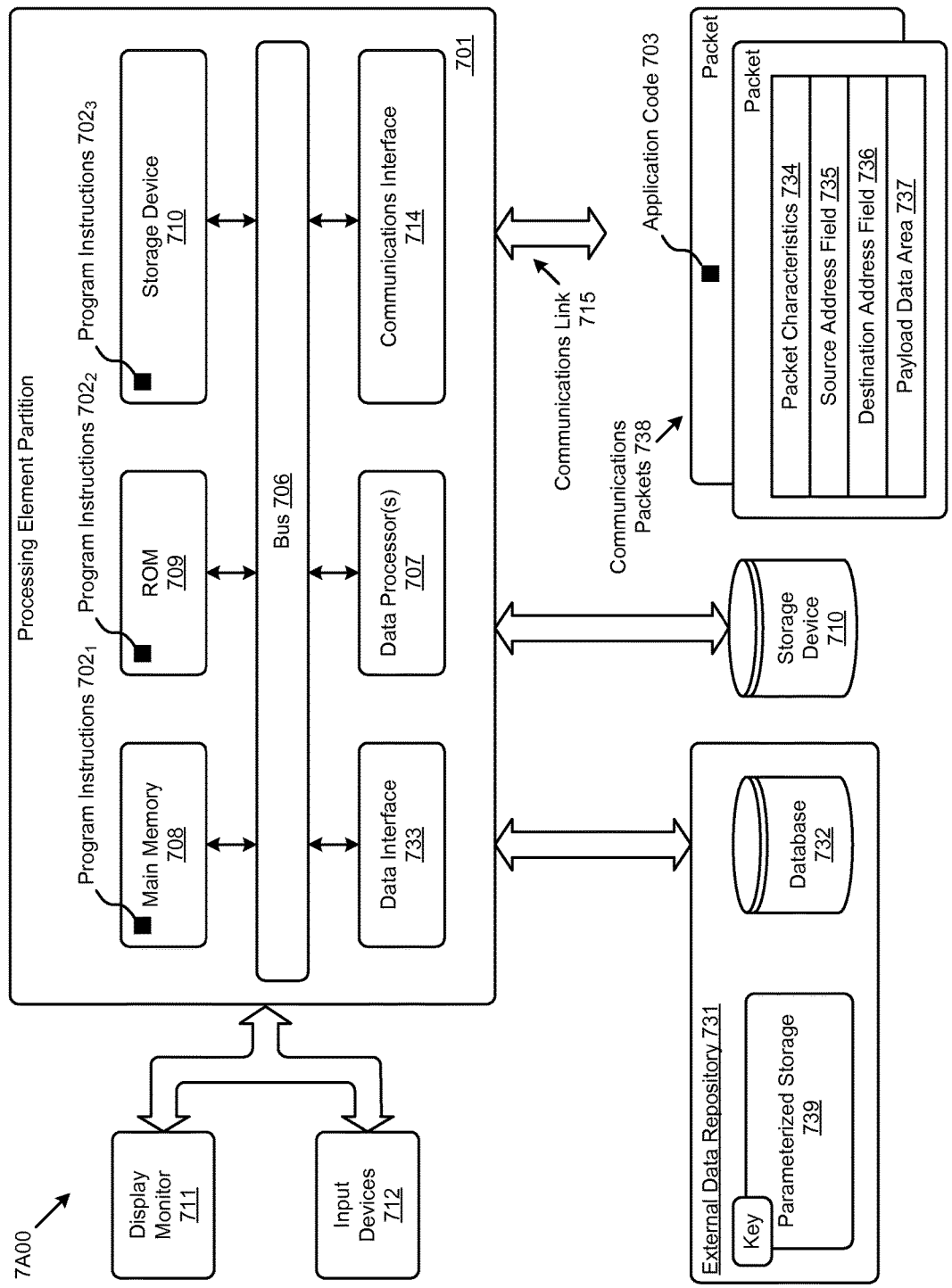
FIG. 7A and FIG. 7B depict exemplary architectures of components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal or external storage device 710 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 7A00 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

The communications link 715 can be configured to transmit (e.g., send, receive, signal, etc.) any types of communications packets 738 comprising any organization of data items. The data items can comprise a payload data area 737, a destination address 736 (e.g., a destination IP address), a source address 735 (e.g., a source IP address), and can include various encodings or formatting of bit fields to populate the shown packet characteristics 734. In some cases the packet characteristics include a version identifier, a packet or payload length, a traffic class, a flow label, etc. In some cases the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 7A00. According to certain embodiments of the disclosure, two or more instances of computer system 7A00 coupled by a communications link 715 (e.g., LAN, PTSN, or wireless network) may perform the sequence of instructions required to practice embodiments of the disclosure using two or more instances of components of computer system 7A00.

The computer system 7A00 may transmit and receive messages such as data and/or instructions organized into a data structure (e.g., communications packets 738). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). A module may include one or more state machines and/or combinational logic used to implement or facilitate the performance characteristics of techniques for detecting disclosed content sources using dynamic steganography.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of detecting disclosed content sources using dynamic steganography). Such files or records can be brought into and/or stored in volatile or non-volatile memory.

Figure 7B:
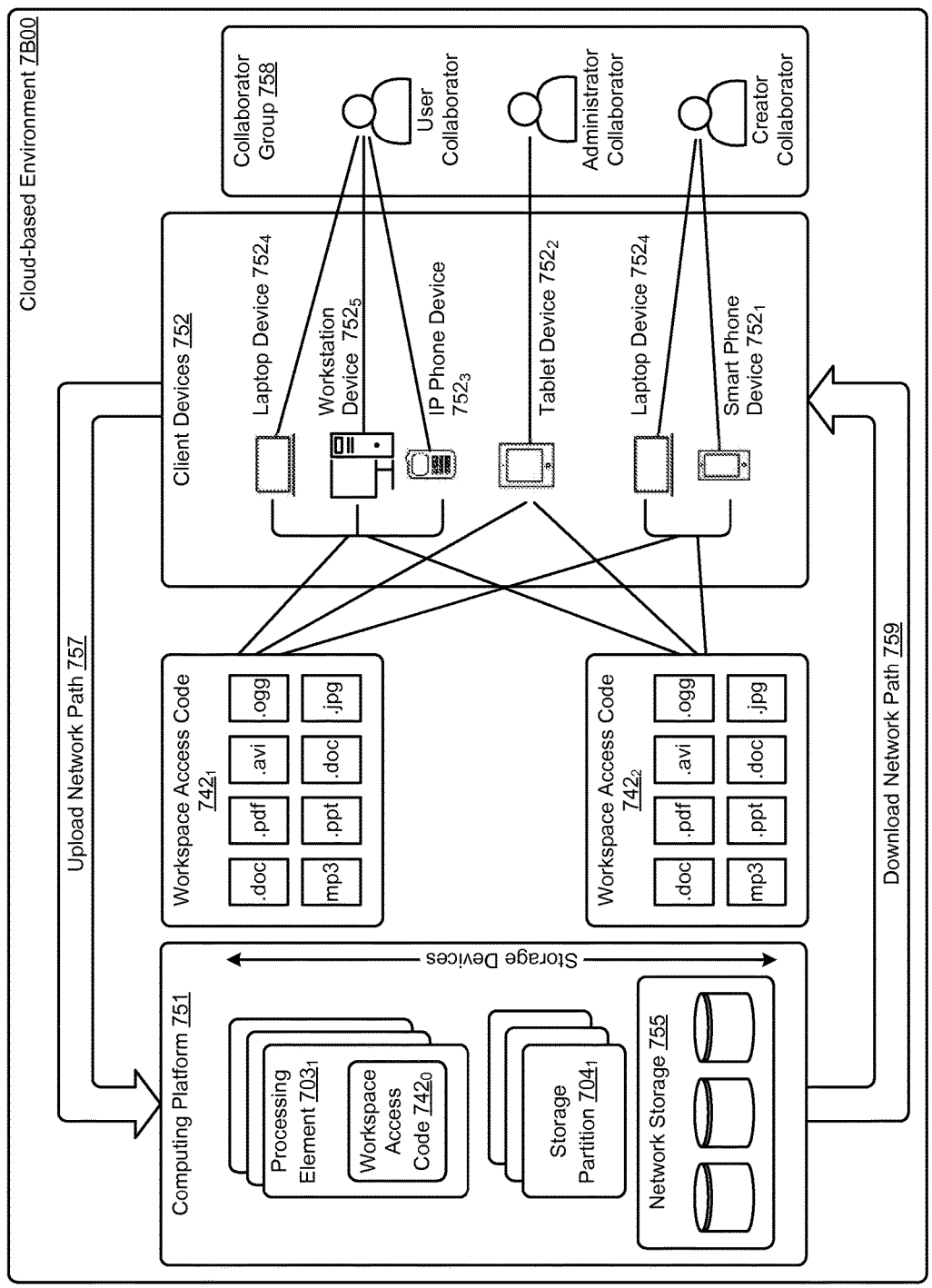

FIG. 7B depicts a block diagram of an instance of a cloud-based environment 7B00. Such a cloud-based environment supports access to workspaces through the execution of workspace access code (e.g., workspace access code $742_0$, workspace access code $742_1$ and workspace access code $742_2$). Workspace access code can be executed on any of the shown client devices 752 (e.g., laptop device $752_4$, workstation device $752_5$, IP phone device $752_3$, tablet device $752_2$, smart phone device $752_1$, etc.). A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. Also, a portion of the workspace access code can reside in and be executed on any computing platform 751, including in a middleware setting. As shown, a portion of the workspace access code resides in and can be executed on one or more processing elements (e.g., processing element $703_1$). The workspace access code can interface with storage devices such the shown network storage 755. Storage of workspaces and/or any constituent files or objects, and/or any other code or scripts or data can be stored in any one or more storage partitions (e.g., storage partition $704_1$). In some environments, a processing element includes forms of storage, such as RAM and/or ROM and/or FLASH, and/or other forms of volatile and non-volatile storage.

A stored workspace can be populated via an upload (e.g., an upload from client devices 752 to a processing element over an upload network path 757). A stored workspace can be delivered to a particular user and/or shared with other particular users via a download (e.g., a download from a processing element to a user device over a download network path 759).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising
identifying a server in a cloud-based environment, wherein the server is interfaced with one or more storage facilities that store an object accessible by two or more users, the object comprises a single image having multiple sites for placement of a steganographic message;
detecting a request to view the object by a requesting user, wherein the requesting user is associated with a role profile comprising one or more attributes;
encoding the one or more attributes of the requesting user into the steganographic message;
applying the steganographic message one or more times to one or more partitions of the object to generate a protected object, wherein the one or more partitions is determined based at least in part on a respective content type of the partition, wherein a plurality of steganographic messages are applied on the single image of the object at some of the multiple sites for placement of the steganographic message; and initiating delivery of a rendered view of the protected object.

2. The method of claim 1, further comprising:

identifying a recovered portion of the rendered view;

detecting the steganographic message from the recovered portion of the rendered view; and decoding the steganographic message to identify the user.

3. The method of claim 2, wherein detecting the steganographic message comprises at least one of, partitioning the recovered portion of the rendered view, or scaling the recovered portion of the rendered view.

4. The method of claim 1, wherein at least one steganographic message site is determined based at least in part on the respective content type.

5. The method of claim 1, further comprising determining an array of candidate sites, and applying the steganographic message to individual ones of the candidate sites when a quantitative threshold is met.

6. The method of claim 1, wherein the steganographic message is a two-dimensional barcode.

7. The method of claim 1, wherein at least one steganographic message is applied to at least one of the one or more partitions in a tiled pattern.

8. The method of claim 1, wherein the at least one of the one or more attributes of the role profile is a hash value.

9. The method of claim 1, wherein the one or more attributes of the role profile comprise at least one of, a user identifier, or a file identifier.

10. The method of claim 1, wherein the one or more attributes comprises a user device associated with at least one of the two or more users.

11. A computer readable medium, embodied in a non-transitory computer readable medium, the non-transitory computer readable medium having stored thereon a sequence of instructions which, when stored in memory and executed by a processor causes the processor to perform a set of acts, the acts comprising:

identifying a server in a cloud-based environment, wherein the server is interfaced with one or more storage facilities that store an object accessible by two or more users, the object comprises a single image having multiple sites thereon for placement of a steganographic message;

detecting a request to view the object by a requesting user, wherein the requesting user is associated with a role profile comprising one or more attributes;

encoding the one or more attributes of the requesting user into the steganographic message;

applying the steganographic message one or more times to one or more partitions of the object to generate a protected object, wherein the one or more partitions is determined based at least in part on a respective content type of the partition, wherein a plurality of steganographic messages are applied on the single image of the object at some of the multiple sites for placement of the steganographic message; and initiating delivery of a rendered view of the protected object.

12. The computer readable medium of claim 11, further comprising instructions which, when stored in memory and executed by a processor causes the processor to perform acts of:

identifying a recovered portion of the rendered view;

detecting the steganographic message from the recovered portion of the rendered view; and decoding the steganographic message to identify the user.

13. The computer readable medium of claim 12, wherein detecting the steganographic message comprises at least one of, partitioning the recovered portion of the rendered view, or scaling the recovered portion of the rendered view.

14. The computer readable medium of claim 11, wherein at least one steganographic message site is determined based at least in part on the respective content type.

15. The computer readable medium of claim 11, further comprising instructions which, when stored in memory and executed by a processor causes the processor to perform acts of determining an array of candidate sites, and applying the steganographic message to individual ones of the candidate sites when a quantitative threshold is met.

16. The computer readable medium of claim 11, wherein the steganographic message is a two-dimensional barcode.

17. The computer readable medium of claim 11, wherein the one or more attributes of the role profile comprise at least one of, a user identifier, or a file identifier.

18. The computer readable medium of claim 11, wherein the one or more attributes comprises a user device associated with at least one of the two or more users.

19. A system comprising:

a server in a cloud-based environment, wherein the server is interfaced with one or more storage facilities that store an object accessible by two or more users, the object comprises a single image having multiple sites thereon for placement of a steganographic message; and a processing element that performs, detecting a request to view the object by a requesting user, wherein the requesting user is associated with a role profile comprising one or more attributes;

encoding the one or more attributes of the requesting user into a steganographic message; and applying the steganographic message one or more times to one or more partitions of the object to generate a protected object, wherein the one or more partitions is determined based at least in part on a respective content type of the partition, wherein a plurality of steganographic messages are applied on the single image of the object at some of the multiple sites for placement of the steganographic message; and initiating delivery of a rendered view of the protected object.

20. The system of claim 19, further comprising a watermarking proxy to perform at least the steps of, identifying a recovered portion of the rendered view;

detecting the steganographic message from the recovered portion of the rendered view; and decoding the steganographic message to identify the user.

* * * * *